(12) United States Patent
Honjo et al.

(10) Patent No.: US 10,171,739 B2
(45) Date of Patent: Jan. 1, 2019

(54) IMAGE PICKUP DEVICE

(71) Applicant: Panasonic Intellectual Property Management Co., Ltd., Osaka (JP)

(72) Inventors: Kenichi Honjo, Osaka (JP); Yasuo Amano, Osaka (JP); Yasuhiro Shingu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/443,492

(22) Filed: Feb. 27, 2017

(65) Prior Publication Data

US 2017/0257574 A1    Sep. 7, 2017

(30) Foreign Application Priority Data

Mar. 2, 2016  (JP) .................................. 2016-039679
Dec. 28, 2016  (JP) .................................. 2016-254947

(51) Int. Cl.
*H04N 5/232* (2006.01)
*H04N 5/357* (2011.01)

(52) U.S. Cl.
CPC ..... *H04N 5/23287* (2013.01); *H04N 5/23258* (2013.01); *H04N 5/3572* (2013.01)

(58) Field of Classification Search
CPC ............. H04N 5/23287; H04N 5/3572; H04N 5/23258
See application file for complete search history.

(56) References Cited

U.S. PATENT DOCUMENTS

| | | | | |
|---|---|---|---|---|
| 2002/0027599 A1* | 3/2002 | Yamazaki | .......... | H04N 5/23248 348/208.99 |
| 2005/0140793 A1* | 6/2005 | Kojima | .............. | H04N 5/23248 348/208.99 |
| 2005/0157181 A1* | 7/2005 | Kawahara | .......... | H04N 5/23245 348/208.6 |
| 2007/0166021 A1* | 7/2007 | Yamazaki | .......... | H04N 5/23248 396/55 |
| 2007/0196086 A1* | 8/2007 | Ishikawa | ............ | H04N 5/23248 396/55 |
| 2009/0174782 A1* | 7/2009 | Kahn | ................... | G02B 27/646 348/208.2 |

(Continued)

FOREIGN PATENT DOCUMENTS

JP    2009-251492    10/2009

*Primary Examiner* — Abdelaaziz Tissire
(74) *Attorney, Agent, or Firm* — Renner Otto Boisselle & Sklar, LLP

(57) ABSTRACT

An image pickup device includes an optical system including a plurality of lenses, an imaging element that captures a subject image formed by the optical system, and a peripheral light quantity correction unit that corrects peripheral light quantity of an image captured by the imaging element. The image pickup device also includes a shake detector that detects shake of the image pickup device, and a drive controller that moves at least one of (i) the plurality of lenses and (ii) the imaging element on a plane perpendicular to an optical axis in response to an output signal of the shake detector to correct the shake. The peripheral light quantity correction unit extracts a predetermined frequency component of the shake and changes a correction amount of the peripheral light quantity in response to the predetermined frequency component of the shake.

6 Claims, 19 Drawing Sheets

(56) References Cited

U.S. PATENT DOCUMENTS

| | | | |
|---|---|---|---|
| 2010/0177198 A1* | 7/2010 | Hayashi | G03B 5/00 348/208.2 |
| 2010/0232032 A1* | 9/2010 | Sato | G02B 15/173 359/683 |
| 2010/0302386 A1* | 12/2010 | Hoshino | H03H 11/04 348/208.4 |
| 2011/0194847 A1* | 8/2011 | Wakamatsu | G03B 5/00 396/55 |
| 2014/0111658 A1* | 4/2014 | Watanabe | H04N 5/23267 348/208.1 |
| 2014/0184836 A1* | 7/2014 | Watanabe | H04N 5/23264 348/208.5 |
| 2014/0184837 A1* | 7/2014 | Shibata | H04N 5/23267 348/208.6 |
| 2015/0281581 A1* | 10/2015 | Sakurai | H04N 5/23287 348/208.2 |
| 2015/0281582 A1* | 10/2015 | Sakurai | H04N 5/23287 348/208.2 |
| 2016/0073007 A1* | 3/2016 | Konishi | H04N 5/23212 348/349 |
| 2016/0255273 A1* | 9/2016 | Wakamatsu | H04N 5/23248 348/208.99 |
| 2016/0261806 A1* | 9/2016 | Honjo | H04N 5/23209 |
| 2016/0269637 A1* | 9/2016 | Shibata | G06T 5/20 |
| 2016/0269640 A1* | 9/2016 | Watanabe | H04N 5/23267 |
| 2017/0078577 A1* | 3/2017 | Wakamatsu | H04N 5/23287 |
| 2017/0134649 A1* | 5/2017 | Wakamatsu | G06T 7/004 |
| 2017/0214855 A1* | 7/2017 | Miyazawa | H04N 5/23287 |
| 2018/0063437 A1* | 3/2018 | Ikeda | H04N 5/23258 |
| 2018/0063439 A1* | 3/2018 | Miyazawa | H04N 5/23287 |
| 2018/0063443 A1* | 3/2018 | Ikeda | H04N 5/23287 |
| 2018/0103207 A1* | 4/2018 | Miyazawa | H04N 5/23261 |

* cited by examiner

FIG. 5
(a)
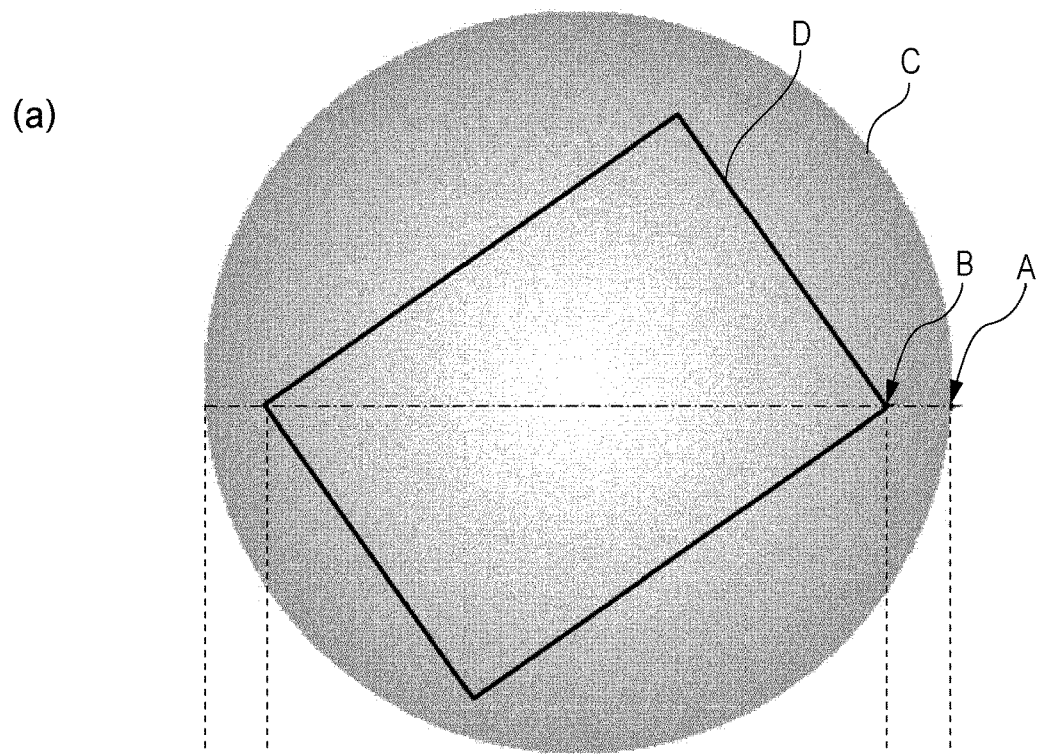
(b)
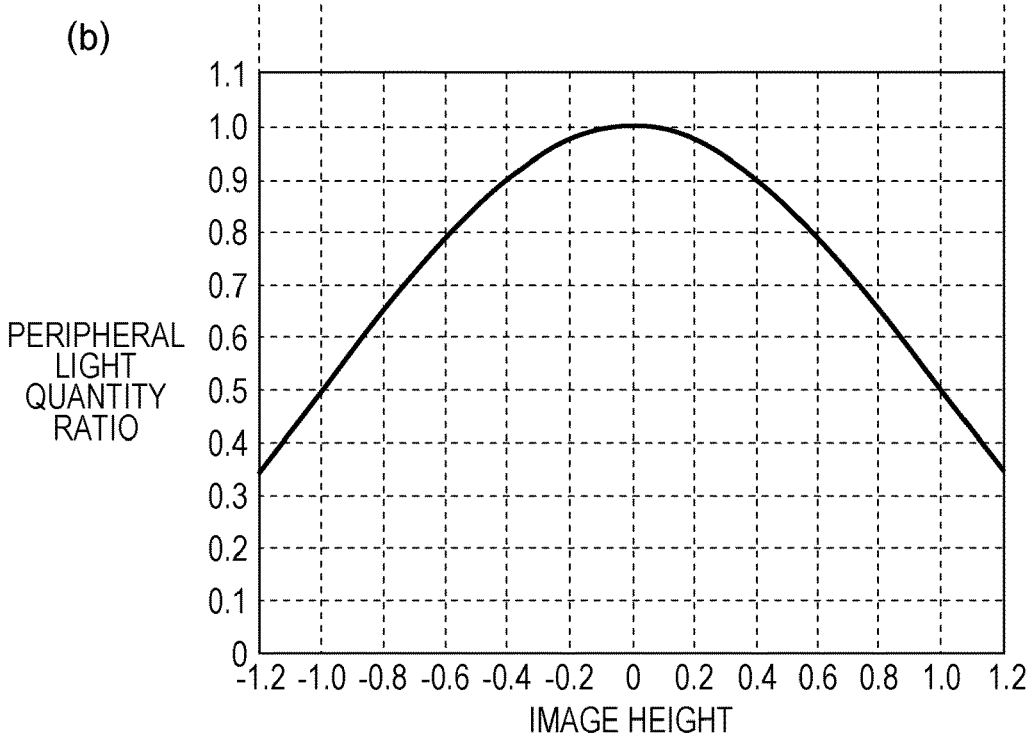

PERIPHERAL LIGHT QUANTITY RATIO

CORRECTION GAIN

PERIPHERAL LIGHT QUANTITY RATIO

PERIPHERAL LIGHT QUANTITY RATIO

CORRECTION GAIN

GAIN G2

GAIN G1

PERIPHERAL LIGHT QUANTITY RATIO

PERIPHERAL LIGHT QUANTITY RATIO

CORRECTION GAIN

PERIPHERAL LIGHT QUANTITY RATIO

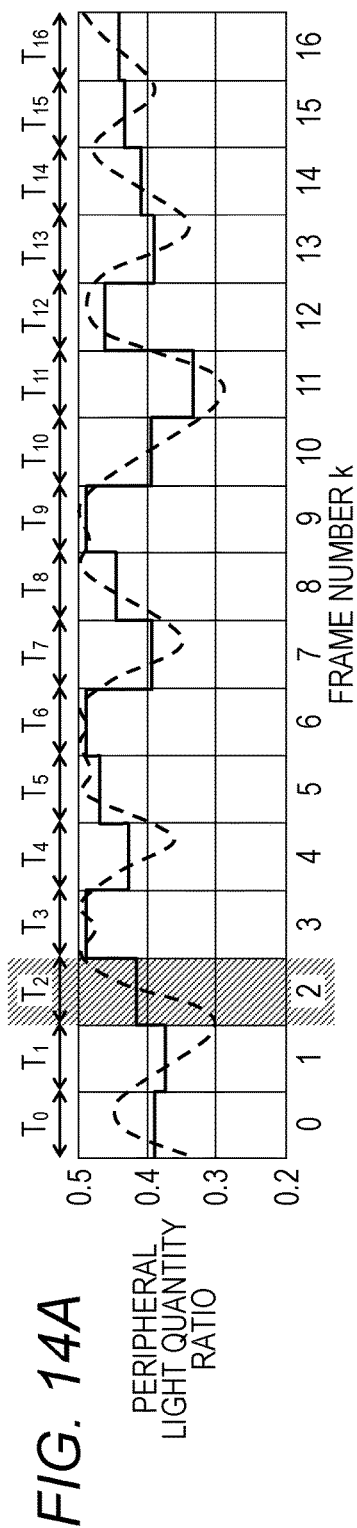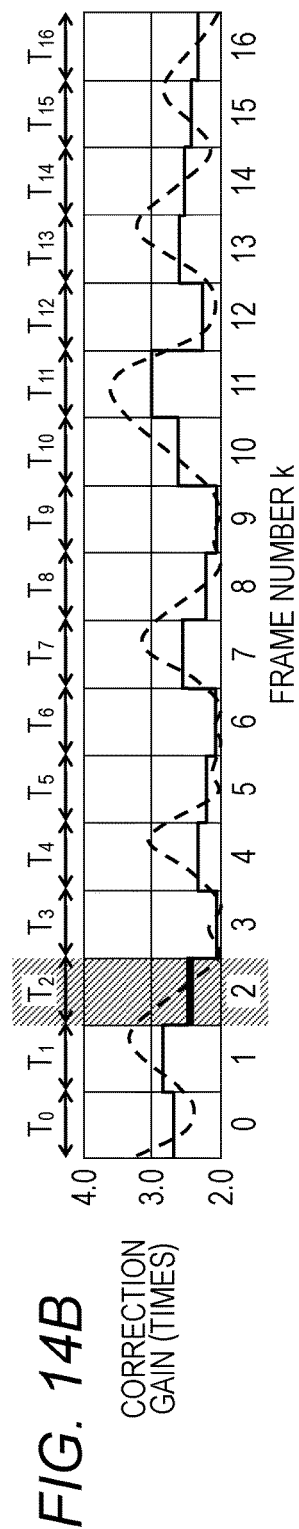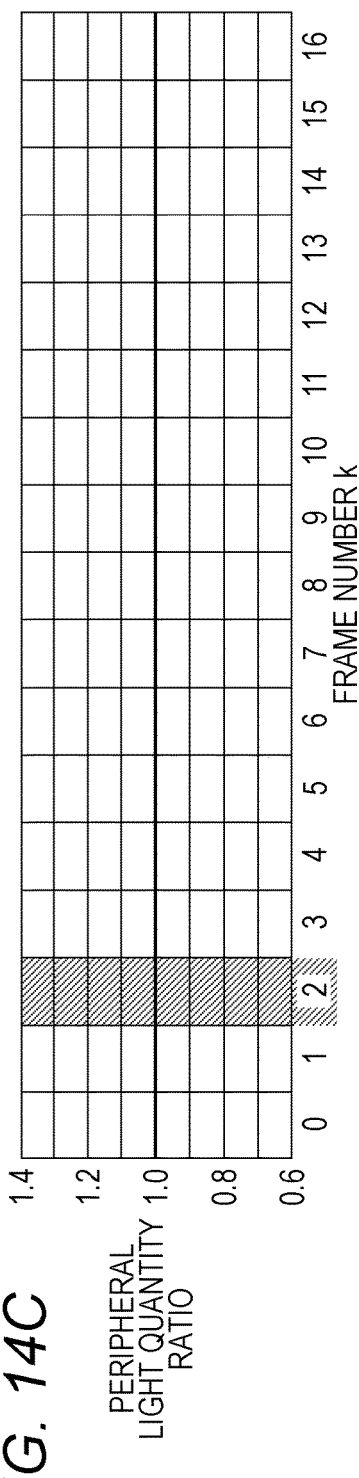

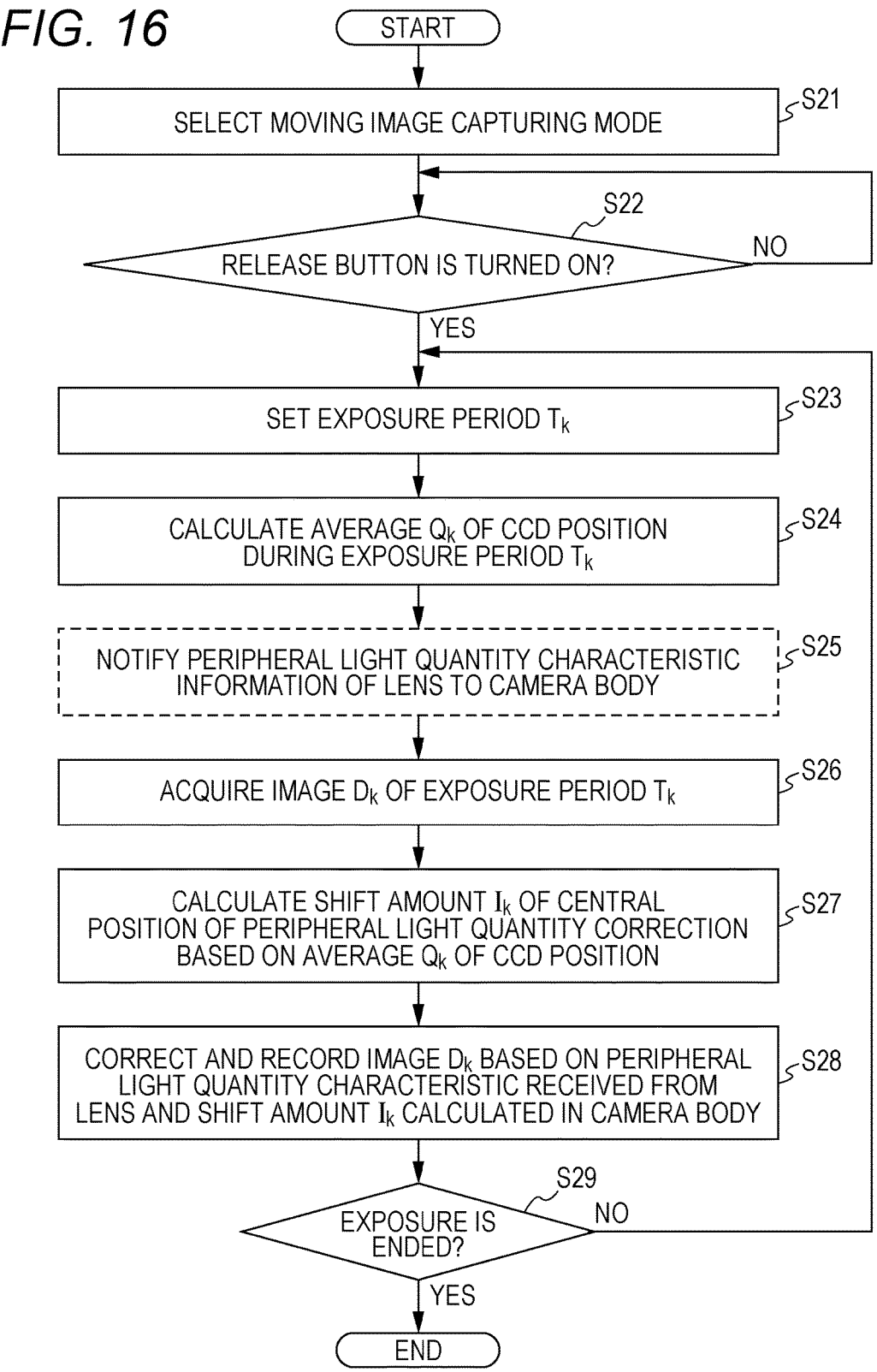

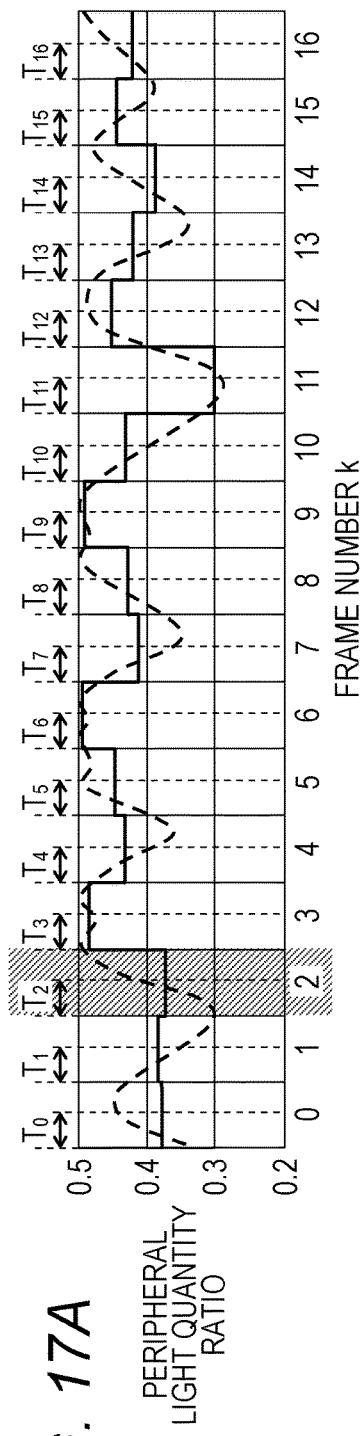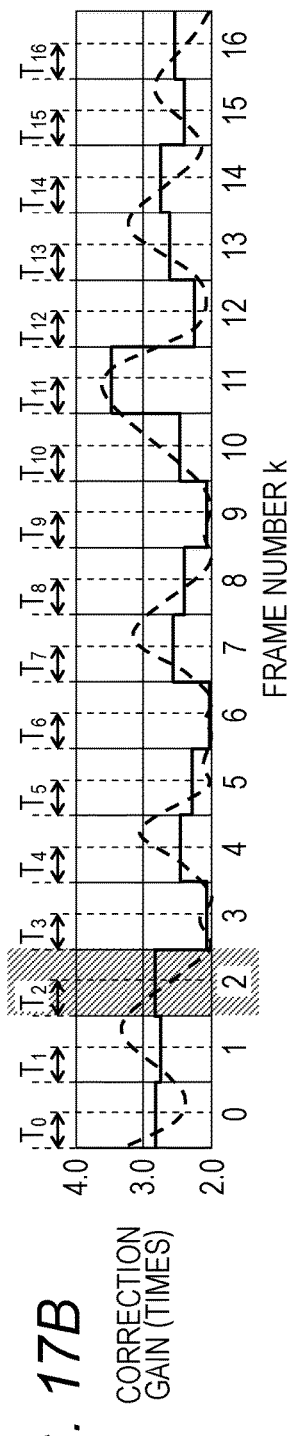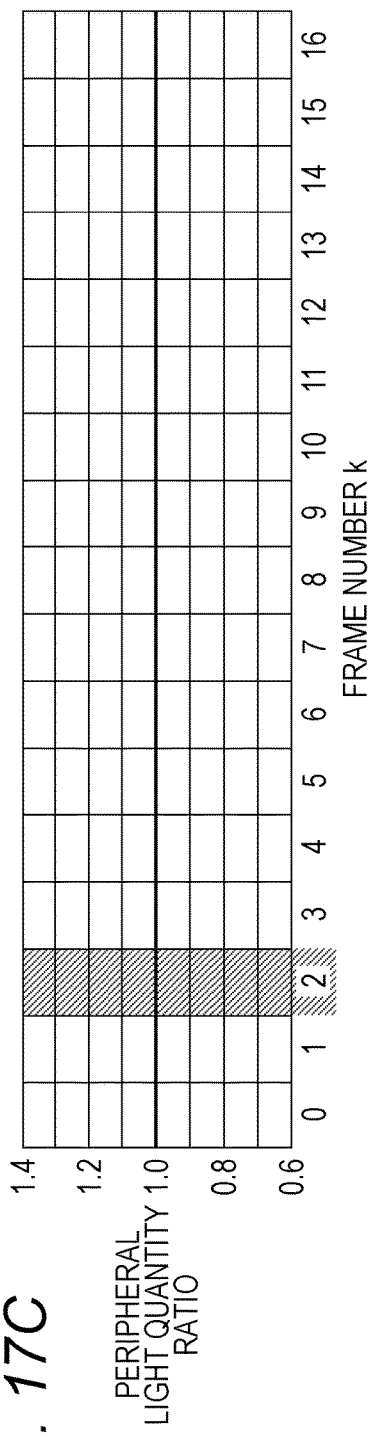

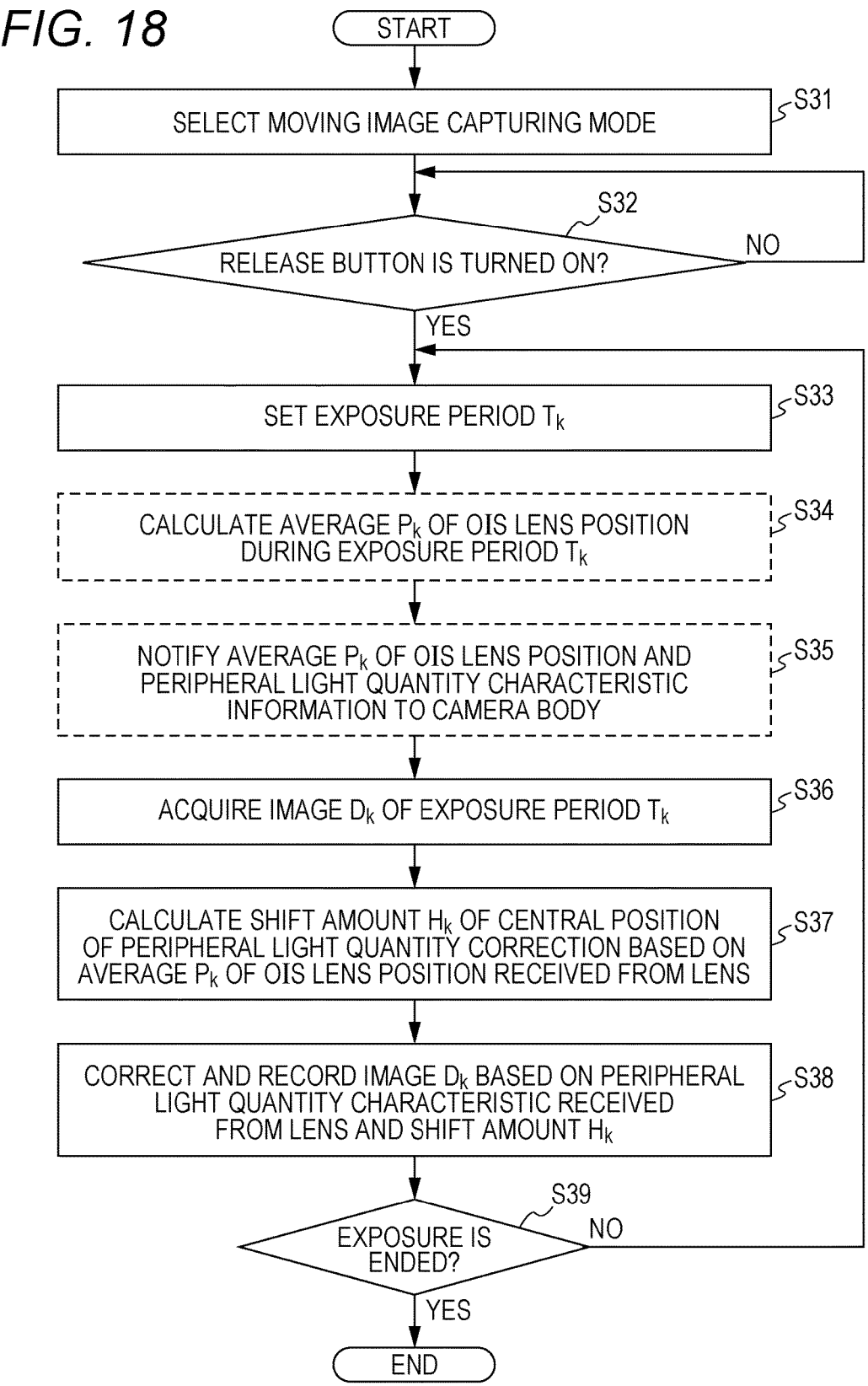

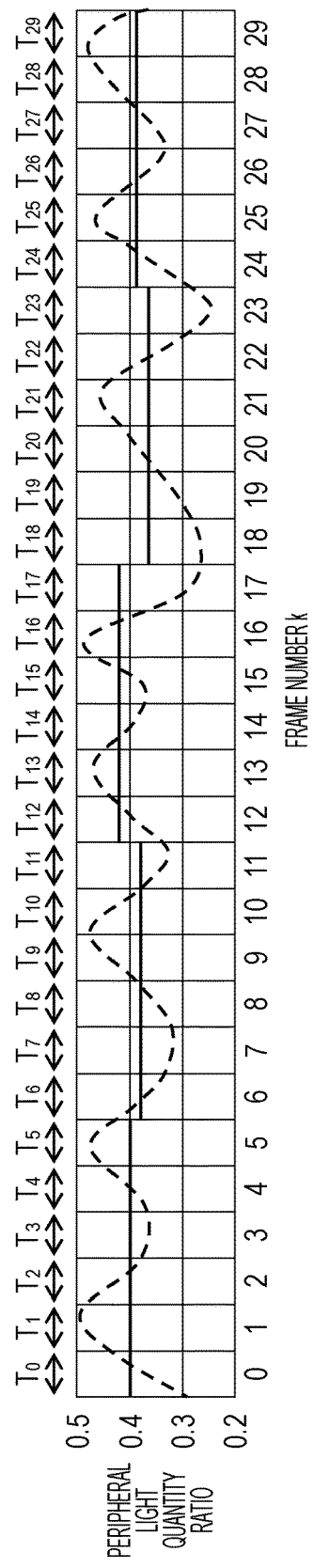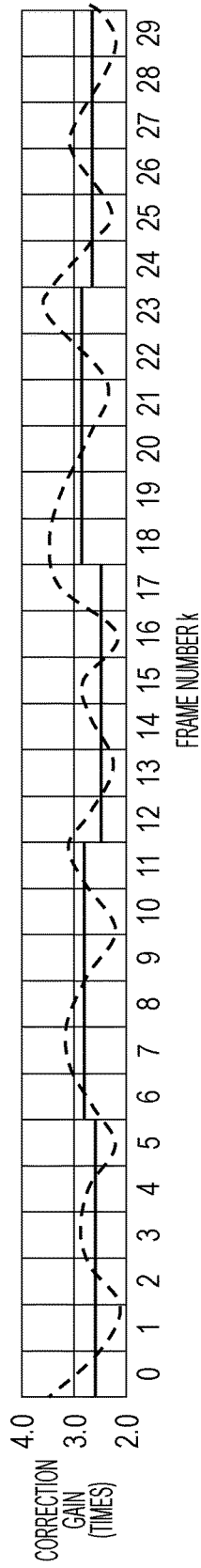

IMAGE PICKUP DEVICE

BACKGROUND

1. Technical Field

The present disclosure relates to an image pickup device that has a shake correction function in one or both of a lens and a camera body.

2. Description of the Related Art

Conventionally, there are image pickup devices in which detection sections (such as gyro sensors) are mounted to detect shake of the image pickup devices. For an interchangeable-lens camera, the detection section to detect shake of the image pickup device is provided in at least one of an interchangeable lens and a camera body (for example, refer to PTL 1). When the detection section is provided in the interchangeable lens, based on a detection result of the detection section, a position of a lens for shake correction included in the interchangeable lens is shifted. On the other hand, when the detection section is provided in the camera body, based on the detection result of the detection section, a position of an imaging element (image sensor) included in the camera body is shifted.

In such an image pickup device, the detection section detects vibration of a frequency band in a range from about 1 Hz to 10 Hz resulting from photographer's hand shake. Based on this detection result, the image pickup device reduces influence of shake on a captured image by driving either or both of the lenses inside the interchangeable lens and the imaging sensor inside the camera body.

CITATION LIST

Patent Literature

PTL 1: Unexamined Japanese Patent Publication No. 2009-251492

SUMMARY

In the image pickup device, a subject image projected on the imaging element through the lens has a characteristic that light quantity decreases as a distance from a center of the imaging element increases. When a correction lens or imaging element is shifted in response to the shake of the image pickup device to reduce influence of the shake on the captured image, the shift of the correction lens or shift of the imaging element further reduces light quantity of the subject image projected on the imaging element as the distance from the center of the imaging element increases. There is a problem that quality of the captured image decreases accordingly. An object of the present disclosure is, by shifting the correction lens or imaging element, to prevent decrease in quality of the captured image due to decrease in the peripheral light quantity of the imaging element projected on the imaging element and to provide good captured image in the image pickup device that reduces influence of the shake during capturing.

In particular, regarding decrease in quality of the captured image due to decrease in the peripheral light quantity of the imaging element projected on the imaging element, an object of the present disclosure is to prevent decrease in quality of the captured image during capturing of a moving image and to provide a good captured moving image.

An image pickup device according to the present disclosure includes an optical system including a plurality of lenses, an imaging element that captures a subject image formed by the optical system, and a peripheral light quantity correction unit that corrects peripheral light quantity of an image captured by the imaging element. The image pickup device also includes a shake detector that detects shake of the image pickup device, and a drive controller that moves at least one of (i) the plurality of lenses and (ii) the imaging element on a plane perpendicular to an optical axis in response to an output signal of the shake detector to correct the shake. The peripheral light quantity correction unit extracts a predetermined frequency component of the shake and changes a correction amount of the peripheral light quantity in response to the predetermined frequency component of the shake.

The present disclosure allows the image pickup device to prevent decrease in quality of captured images due to decrease in peripheral light quantity projected on the imaging element, providing good captured images. In particular, the present disclosure allows the image pickup device to prevent decrease in quality of captured images during capturing of moving images, providing good captured moving images.

BRIEF DESCRIPTION OF THE DRAWINGS

FIG. 5 is a principle diagram of the peripheral light quantity drop in the digital camera according to the first exemplary embodiment;

FIG. 14A is a waveform chart illustrating temporal variation of the peripheral light quantity ratio updated every exposure period Tk in the shake correction process according to the second exemplary embodiment;

FIG. 14B is a waveform chart illustrating temporal variation of the peripheral light quantity correction gain updated every exposure period Tk in the shake correction process according to the second exemplary embodiment;

FIG. 14C is a waveform chart illustrating temporal variation of the peripheral light quantity ratio after the peripheral light quantity correction updated every exposure period Tk in the shake correction process according to the second exemplary embodiment;

FIG. 16 is a flowchart illustrating a peripheral light quantity correction process by CCD shift in the shake correction process of the digital camera according to the second exemplary embodiment;

FIG. 17A is a waveform chart illustrating temporal variation of the peripheral light quantity ratio updated every frame number k in the shake correction process according to the second exemplary embodiment;

FIG. 17B is a waveform chart illustrating temporal variation of the peripheral light quantity correction gain updated every frame number k in the shake correction process according to the second exemplary embodiment;

FIG. 17C is a waveform chart illustrating temporal variation of the peripheral light quantity ratio after the peripheral light quantity correction updated every frame number k in the shake correction process according to the second exemplary embodiment;

FIG. 18 is a flowchart illustrating the peripheral light quantity correction process by OIS lens shift in the shake correction process of the digital camera according to the second exemplary embodiment;

FIG. 19A is a waveform chart illustrating temporal variation of the peripheral light quantity ratio before the peripheral light quantity correction updated every six-frame exposure period in the shake correction process according to a third exemplary embodiment; and FIG. 19B is a waveform chart illustrating temporal variation of the peripheral light quantity correction gain updated every six-frame exposure period in the shake correction process according to the third exemplary embodiment.

DETAILED DESCRIPTION

Exemplary embodiments will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiments.

It is to be noted that the accompanying drawings and the following description are provided for a person skilled in the art to fully understand the present disclosure, and are not intended to limit the subject described in the appended claims. The following describes a digital camera as one example of an image pickup device.

First Exemplary Embodiment

A digital camera according to the present exemplary embodiment has a shake correction function (function to correct image shake) to reduce influence of shake of the camera on a captured image in each of an interchangeable lens and a camera body. The following describes in detail a configuration and operation of the camera according to the present exemplary embodiment.

In the following description, a function to shift a correction lens inside an interchangeable lens to correct shake is referred to as "an optical image stabilizer (OIS) function." In addition, a function to shift an imaging element inside the camera body to correct shake is referred to as "a body image stabilizer (BIS) function."

1. Configuration

Figure 1:
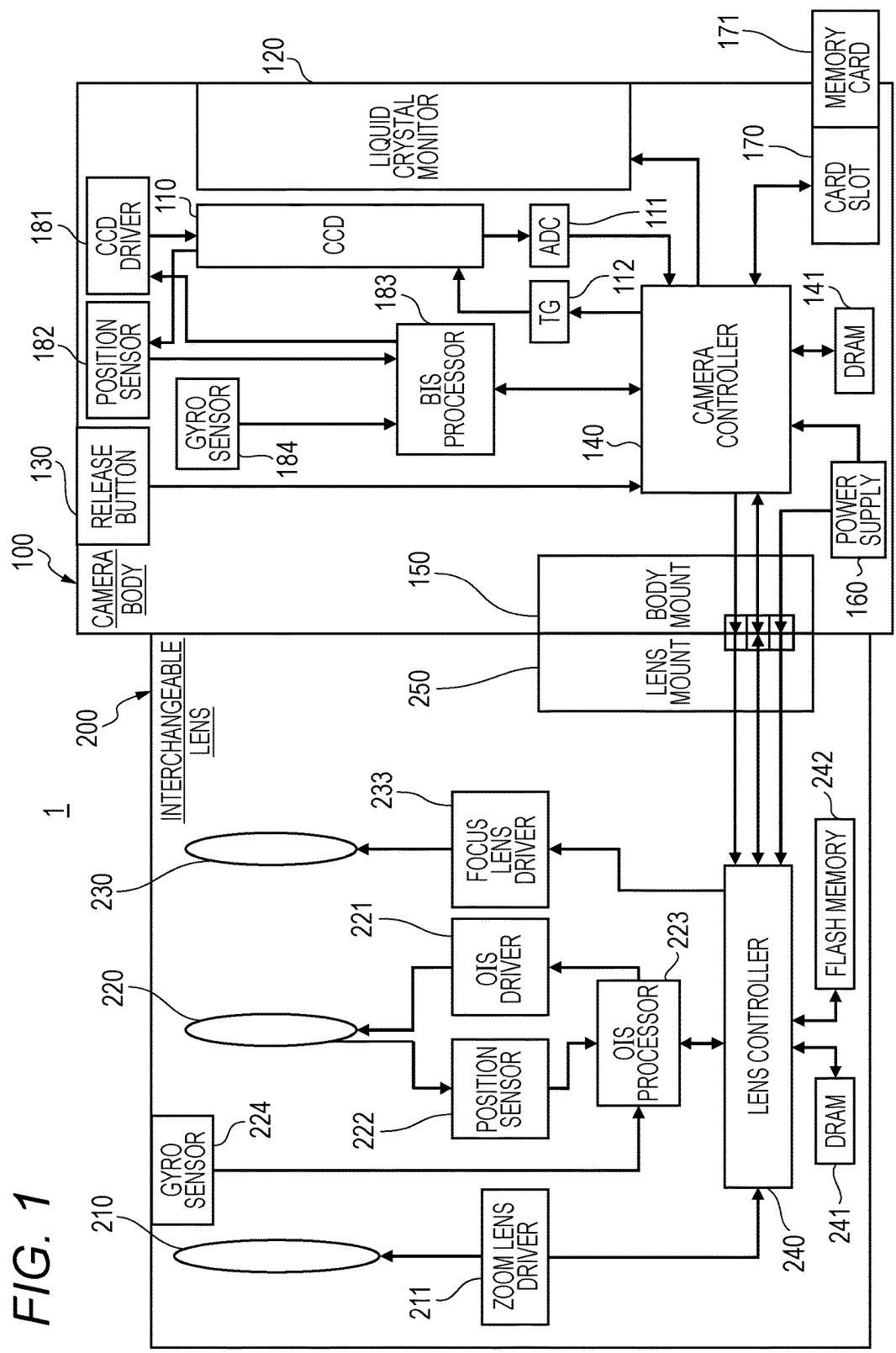
FIG. 1 is a block diagram illustrating a configuration of a digital camera according to a first exemplary embodiment.

FIG. 1 is a block diagram illustrating a configuration of digital camera 1 according to the first exemplary embodiment. Digital camera 1 includes camera body 100 and interchangeable lens 200 detachable thereto.

1-1. Camera Body

Camera body 100 includes charge coupled device (CCD) 110, liquid crystal monitor 120, camera controller 140, body mount 150, power supply 160, and card slot 170.

Camera controller 140 controls the overall operation of digital camera 1 by controlling components such as CCD 110 in response to instructions from release button 130. Camera controller 140 transmits a vertical synchronizing signal to timing generator (TG) 112. In parallel therewith, camera controller 140 generates an exposure synchronizing signal. Camera controller 140 transmits the generated exposure synchronizing signal to lens controller 240 periodically through body mount 150 and lens mount 250. Camera controller 140 uses dynamic random access memory (DRAM) 141 as a work memory during a control operation or image processing operation.

CCD 110 captures a subject image that enters through interchangeable lens 200 to generate image data. The generated image data is digitized by an analog-to-digital converter (ADC) 111. The digitized image data undergoes predetermined image processing performed by camera controller 140. Examples of the predetermined image processing include a gamma correction process, white balance correction process, flaw correction process, YC conversion process, electronic zoom process, or Joint Photographic Experts Group (JPEG) compression process.

CCD 110 operates at timing controlled by timing generator 112. Examples of the operation of CCD 110 include an imaging operation of still images and an imaging operation of through images. The trough image is mainly a moving image and is displayed on liquid crystal monitor 120 in order to determine composition for a user to capture a still image.

Liquid crystal monitor 120 displays an image indicated by image data for display that undergoes image processing performed by camera controller 140. Liquid crystal monitor 120 can selectively display the moving image and the still image.

Card slot 170 can be equipped with memory card 171, and controls memory card 171 based on control from camera controller 140. Digital camera 1 can store image data into memory card 171 and read image data from memory card 171.

Power supply 160 supplies electric power to each component inside digital camera 1.

Body mount 150 is mechanically and electrically connectable to lens mount 250 of interchangeable lens 200. Camera body 100 and interchangeable lens 200 can transmit and receive data through connectors installed in body mount 150 and lens mount 250. Body mount 150 transmits the exposure synchronizing signal received from camera controller 140 to lens controller 240 through lens mount 250. Body mount 150 transmits other control signals received from camera controller 140 to lens controller 240 through lens mount 250. Body mount 150 transmits a signal received from lens controller 240 through lens mount 250 to camera controller 140. Body mount 150 supplies electric power from power supply 160 to overall interchangeable lens 200 through lens mount 250.

As a configuration to implement a BIS function to correct hand shake by shifting CCD 110, camera body 100 includes gyro sensor 184 that detects shake of camera body 100, and BIS processor 183 that controls a shake correction process based on a detection result of gyro sensor 184. Camera body 100 further includes CCD driver 181 that moves CCD 110 and position sensor 182 that detects a position of CCD 110. CCD driver 181 can be implemented, for example, by a magnet and a plate coil. Position sensor 182 is a sensor that detects the position of CCD 110 in a plane perpendicular to an optical axis of an optical system. Position sensor 182 can be implemented, for example, by a magnet and a Hall element. In response to a signal from gyro sensor 184 and a signal from position sensor 182, BIS processor 183 controls CCD driver 181 and shifts CCD 110 in the plane perpendicular to the optical axis so as to offset shake of camera body 100. While an imaging sensor included in camera body 100 is a CCD, another imaging sensor may be used, such as a complementary metal oxide semiconductor (CMOS) sensor. Also, CCD driver 181 may use another actuator, such as a stepping motor and ultrasonic motor. When a stepping motor is used for the actuator, it becomes possible to perform open control and to eliminate the need for the position sensor accordingly.

1-2. Interchangeable Lens

Interchangeable lens 200 includes an optical system, lens controller 240, and lens mount 250. The optical system includes zoom lens 210, OIS lens 220, and focus lens 230.

Zoom lens 210 is a lens for changing magnification of a subject image formed by the optical system. Zoom lens 210 includes one or more lenses. Zoom lens driver 211 includes a zoom ring that a user can operate, conveys the operation made by the user to zoom lens 210, and moves zoom lens 210 along an optical axis direction of the optical system.

Focus lens 230 is a lens for changing a focus condition of the subject image formed on CCD 110 in the optical system. Focus lens 230 includes one or more lenses.

Focus lens driver 233 includes a motor. Focus lens driver 233 moves focus lens 230 along the optical axis of the optical system in response to control from lens controller 240. Focus lens driver 233 can be implemented by a DC motor, stepping motor, servo motor, or ultrasonic motor.

In an OIS function to correct hand shake through shift of OIS lens 220, OIS lens 220 is a lens for correcting shake of the subject image formed by the optical system of interchangeable lens 200. OIS lens 220 reduces the shake of the subject image on CCD 110 by moving in a direction to offset the shake of digital camera 1. OIS lens 220 includes one or more lenses. In response to control from OIS processor 223, OIS driver 221 shifts OIS lens 220 in the plane perpendicular to the optical axis of the optical system.

OIS driver 221 can be implemented, for example, by a magnet and a plate coil. Position sensor 222 is a sensor that detects a position of OIS lens 220 in the plane perpendicular to the optical axis of the optical system. Position sensor 222 can be implemented, for example, by a magnet and a Hall element. OIS processor 223 controls OIS driver 221 in response to output of position sensor 222 and output of gyro sensor 224 (shake detector). Here, as OIS driver unit 221, another actuator may be used, such as an ultrasonic motor.

Gyro sensor 184 or gyro sensor 224 detects shake (vibration) in a yawing direction and a pitching direction based on change in angle per unit time, that is, angular velocity of digital camera 1. Gyro sensor 184 or gyro sensor 224 outputs an angular velocity signal that indicates an amount of detected shake (angular velocity) to OIS processor 223 or BIS processor 183. The angular velocity signal that is output from gyro sensor 184 or gyro sensor 224 can contain a wide frequency component resulting from hand shake or mechanical noise. The gyro sensor is used as an angular velocity detection section in the present exemplary embodiment; however, another sensor can also be used instead of the gyro sensor as long as the sensor can detect shake of digital camera 1.

Camera controller 140 and lens controller 240 may include hard-wired electronic circuitry, and may include a microcomputer using a program.

Digital camera 1 can store image data into flash memory 242 and read image data from flash memory 242.

Lens controller 240 uses DRAM 241 as a work memory during a control operation or image processing operation.

1-3. OIS Processor

Figure 2:
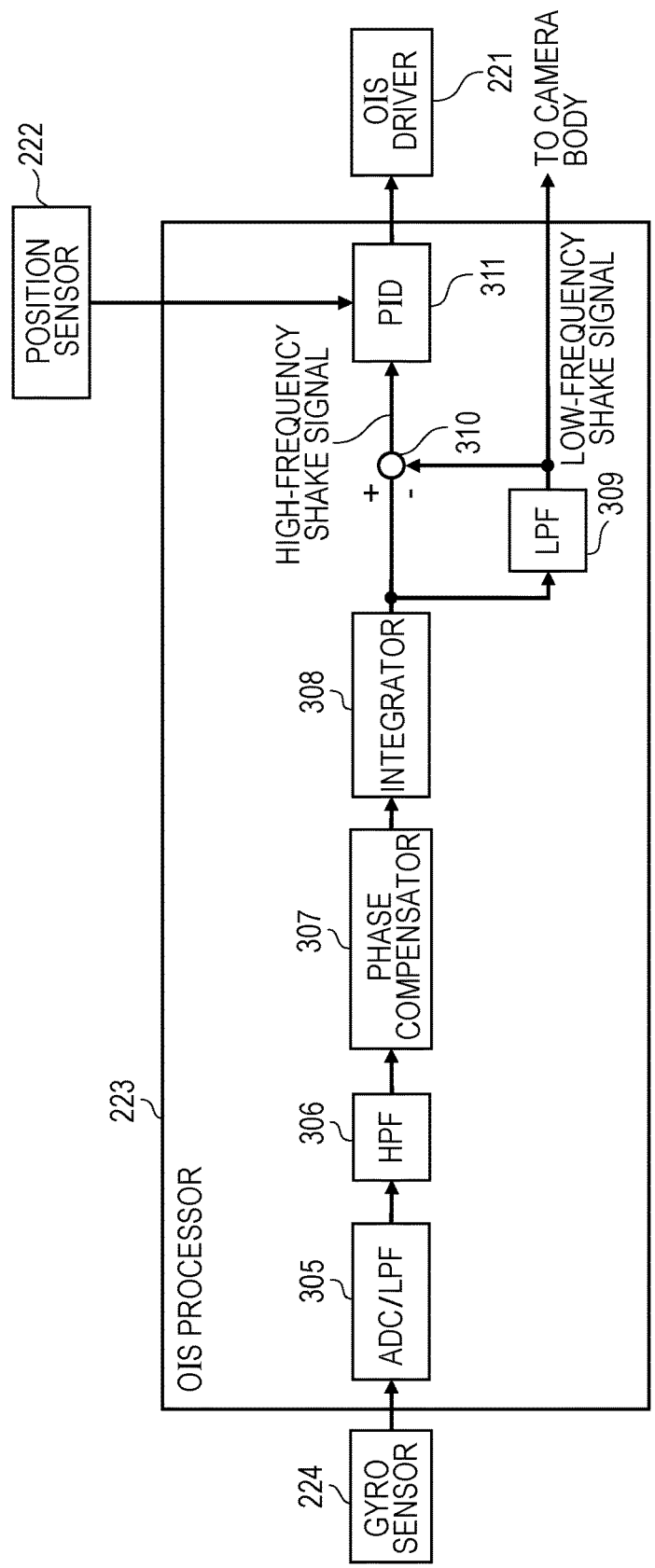
FIG. 2 is a block diagram illustrating a configuration of an OIS processor in the digital camera according to the first exemplary embodiment.

FIG. 2 is a block diagram illustrating a configuration of OIS processor 223 in the digital camera according to the first exemplary embodiment. The configuration of OIS processor 223 in interchangeable lens 200 will be described with reference to FIG. 2. OIS processor 223 includes analog-to-digital converter (ADC)/low pass filter (LPF) 305, high pass filter (HPF) 306, phase compensator 307, integrator 308, LPF 309, adder 310, and proportional-integral-differential (PID) controller 311.

ADC/LPF 305 converts the angular velocity signal from gyro sensor 224 from an analog format into a digital format. Furthermore, in order to eliminate noise and to extract only shake of digital camera 1, ADC/LPF 305 cuts off a high-frequency component of the angular velocity signal converted into a digital format. A hand-shake frequency of a photographer is a low frequency higher than 0 Hz and equal to or lower than about 10 Hz. A cut-off frequency of LPF is set in consideration of this point. A function of LPF can be omitted when noise does not pose any problems.

In order to cut off drift components, HPF 306 cuts off a predetermined low-frequency component contained in a signal received from ADC/LPF 305. Phase compensator 307 corrects phase delay resulting from OIS driver 221 or lens-body communication (to be described later) on a signal received from HPF 306.

Integrator 308 integrates a signal that indicates angular velocity of the shake (vibration) that is input from phase compensator 307 to generate a signal that indicates an angle of the shake (vibration). Hereinafter, the signal generated by integrator 308 is referred to as "shake detection signal."

The shake detection signal from integrator 308 is input into LPF 309 and adder 310. LPF 309 cuts a high-frequency component of the shake detection signal and passes a low-frequency component (hereinafter referred to as "first shake signal"). The first shake signal is a signal that indicates an amount of shake correction regarding shake in a low-frequency region. Here, the cut-off frequency of LPF 309 is set, for example, at 1 Hz in consideration of the frequency of hand shake (higher than 0 Hz and equal to or lower than 10 Hz). Although LPF is used here for generating the low-frequency component shake signal, any other filter may be used as long as the filter cuts the high-frequency component, such as a low-shelf filter (LSF), for example. The filter configuration is not limited to this configuration, and another configuration may be used, for example, exchanging order of HPF 306 and integrator 308.

By subtracting the low-frequency component of the shake detection signal extracted by LPF 309 from the shake detection signal that is input from integrator 308, adder 310 extracts the high-frequency component of the shake detection signal (hereinafter referred to as "second shake signal"). The second shake signal is a signal that indicates the amount of shake correction regarding shake in a high-frequency region (between 1 Hz and 10 Hz inclusive). The second shake signal is input into PID controller 311. On the other hand, the first shake signal is transmitted to camera body 100.

PID controller 311 performs PID control based on a difference between the input second shake signal and current positional information on OIS lens 220 received from position sensor 222. PID controller 311 generates a drive signal for OIS driver 221 and sends the drive signal to OIS driver 221. OIS driver 221 drives OIS lens 220 in response to the drive signal.

1-4. BIS Processor

Figure 3:
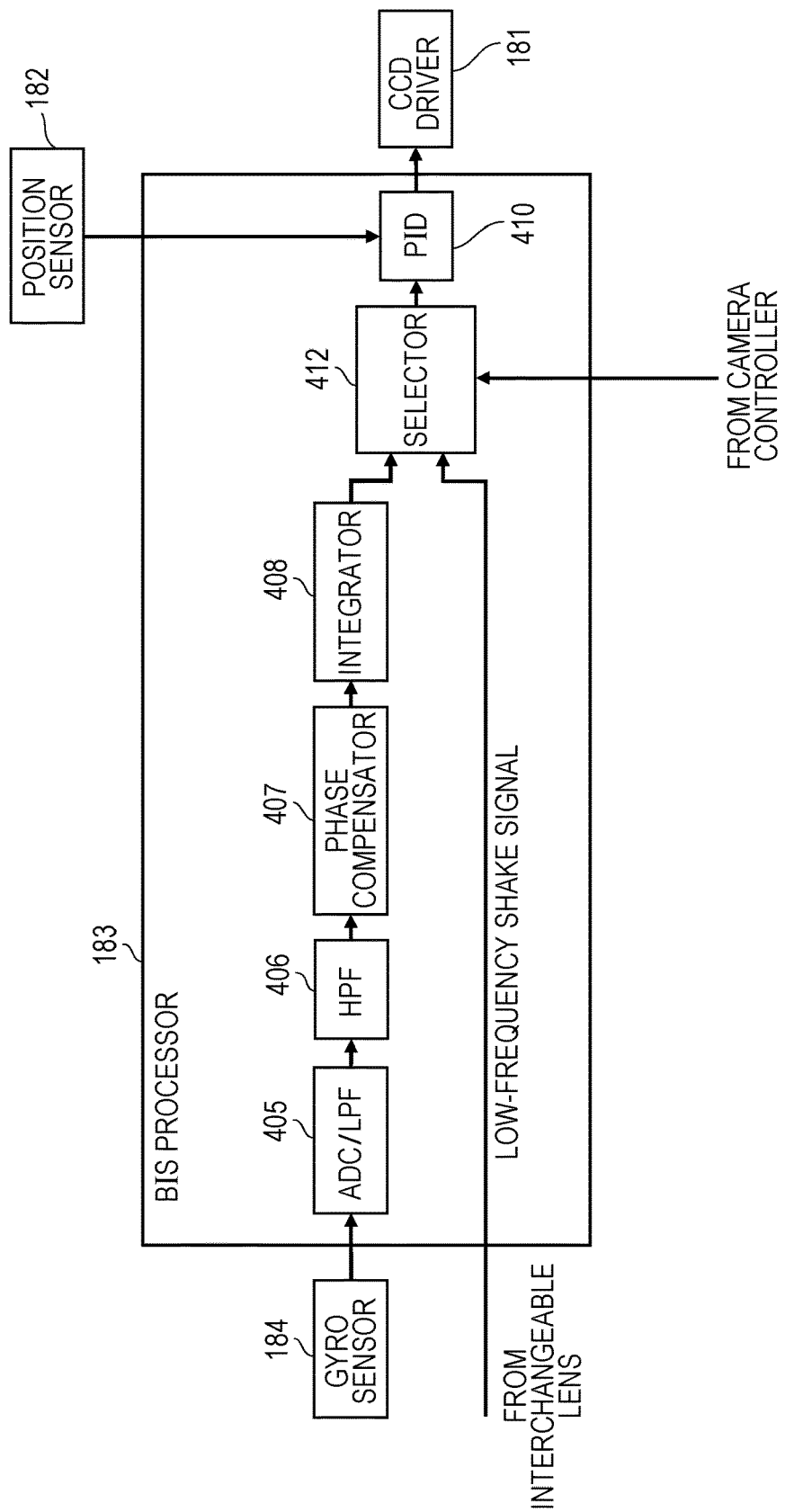
FIG. 3 is a block diagram illustrating a configuration of a BIS processor in the digital camera according to the first exemplary embodiment.

FIG. 3 is a block diagram illustrating a configuration of BIS processor 183 in digital camera 1 according to the first exemplary embodiment. The configuration of BIS processor 183 in camera body 100 will be described with reference to FIG. 3. BIS processor 183 includes ADC/LPF 405, HPF 406, phase compensator 407, integrator 408, selector 412, and PID controller 410.

Basic functions of ADC/LPF 405, HPF 406, phase compensator 407, integrator 408, and PID controller 410 are identical to functions of corresponding components in OIS processor 223.

BIS processor 183 is in particular configured to perform the shake correction process in response to one of output of gyro sensor 184 provided inside camera body 100 (output of integrator 408) and the first shake signal received from interchangeable lens 200. Accordingly, BIS processor 183 includes selector 412 that selects one of the output of gyro sensor 184 provided inside camera body 100 (output of integrator 408) and the first shake signal received from interchangeable lens 200, selector 412 outputting the selected signal to PID controller 410. When camera body 100 implements the shake correction function, such as when interchangeable lens 200 fails to have the shake correction function, selector 412 selects the output of gyro sensor 184 (output of integrator 408). Selector 412 is controlled by camera controller 140.

PID controller 410 generates the drive signal for shifting CCD 110 in response to the output from position sensor 182, and to the output from integrator 408 or the first shake signal from interchangeable lens 200. PID controller 410 then outputs the generated drive signal to CCD driver 181. CCD driver 181 drives CCD 110 in response to the drive signal.

2. Operation 2-1. Shake Correction Process

The following describes the shake correction process in digital camera 1 configured as described above. The following describes an example of driving OIS lens 220 and CCD 110 in response to the signal from gyro sensor 224 provided on a lens side among two gyro sensors 224, 184. That is, digital camera 1 uses gyro sensor 224 provided on a lens side. At this time, selector 412 inside BIS processor 183 is controlled to select the first shake signal and output the selected first shake signal to PID controller 410. At this time, digital camera 1 operates with interchangeable lens 200 including gyro sensor 224 to be used being a master and camera body 100 being a slave.

OIS processor 223 receives the detection signal from gyro sensor 224, and generates the shake detection signal from the received detection signal. OIS processor 223 divides the shake detection signal into the second shake signal and the first shake signal. OIS processor 223 generates the drive signal for shifting OIS lens 220 based on the second shake signal and positional information from position sensor 222, and outputs the generated drive signal to OIS driver 221. In response to the drive signal from OIS processor 223, OIS driver 221 shifts OIS lens 220 on the plane perpendicular to the optical axis so as to cancel high-frequency shake detected by gyro sensor 224 (between 1 Hz and 10 Hz inclusive).

The first shake signal generated by OIS processor 223 is transmitted to camera body 100 by using interchangeable lens-camera body communication through lens mount 250 and body mount 150. At this time, in BIS processor 183 of camera body 100, selector 412 is controlled so as to select the first shake signal from interchangeable lens 200. In response to the first shake signal from interchangeable lens 200 and positional information from position sensor 182, BIS processor 183 generates the drive signal for driving CCD 110, and transmits the generated drive signal to CCD driver 181. In response to the drive signal from BIS processor 183, CCD driver 181 shifts CCD 110 on the plane perpendicular to the optical axis so as to cancel low-frequency shake detected by gyro sensor 224 (lower than 1 Hz). Here, while the interchangeable lens-camera body communication is made through lens mount 250 and body mount 150, the communication may be made using optical communication or wireless communication.

As described above, digital camera 1 of the present exemplary embodiment operates the shake correction function on an interchangeable lens 200 side based on the high-frequency component (between 1 Hz and 10 Hz inclusive) in the detected shake signal. Digital camera 1 operates the shake correction function on a camera body 100 side based on the low-frequency component in the detected shake signal (lower than 1 Hz). Thus, according to the present exemplary embodiment, since camera body 100 and interchangeable lens 200 share the shake correction function, in the interchangeable lens 200 side it only needs to correct the high-frequency component of the shake signal. Therefore, it becomes possible to use a correction range of OIS lens 220 effectively on the interchangeable lens 200 side.

2-2. Basic Principle of Peripheral Light Quantity Correction

As described above, digital camera 1 according to the present exemplary embodiment includes interchangeable lens 200 and camera body 100. Digital camera 1 corrects image shake by causing the OIS function on the interchangeable lens 200 side and the BIS function of camera body 100 to operate in cooperation with each other. A basic principle of peripheral light quantity correction in digital camera 1 will be described below.

Figure 4:
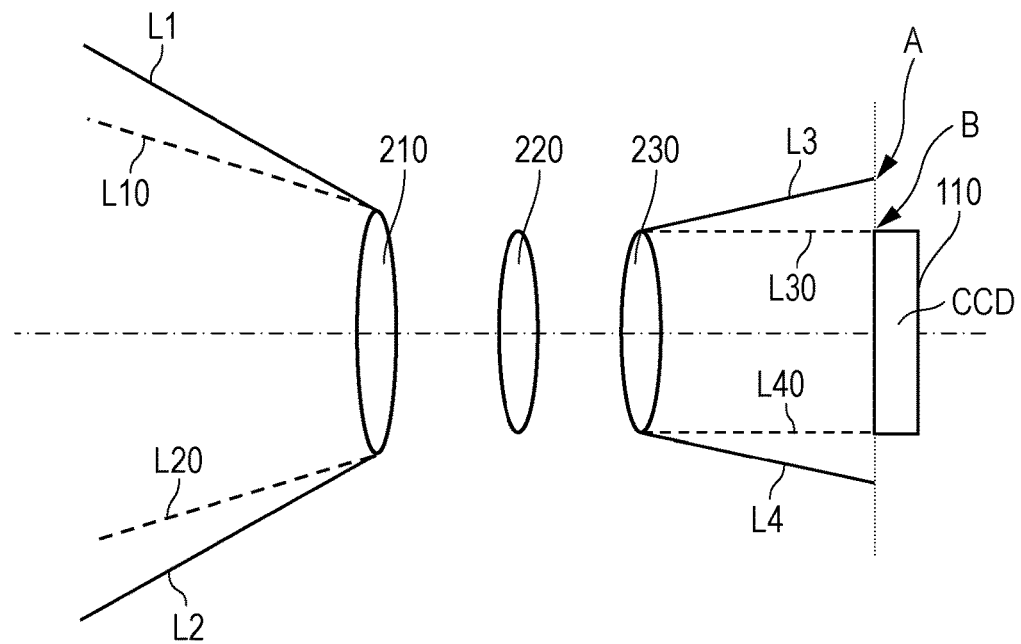
FIG. 4 is a diagram illustrating a principle of peripheral light quantity drop in the digital camera according to the first exemplary embodiment.

FIG. 4 is a diagram illustrating a principle of peripheral light quantity drop in digital camera 1 according to the first exemplary embodiment. The optical system includes zoom lens 210, OIS lens 220, and focus lens 230. The imaging element includes CCD 110. Although OIS lens 220 has a function to correct hand shake by shifting perpendicularly to the optical axis, FIG. 4 illustrates an example in which OIS lens 220 is held at a center. L1 and L2 each indicate a boundary of a light range in which the subject image can be caught. The light range indicated by L1 and L2 in which the subject image is caught corresponds to the light range indicated by L3 and L4 on the CCD 110 side. In contrast, L30 and L40 on the CCD 110 side each indicate a boundary of a light range captured by CCD 110, and the light range corresponds to the light range indicated by L10 and L20 on the subject side (left side of zoom lens 210). Reference sign A in FIG. 4 indicates an intersection of an extension line of a surface of CCD 110 and light range L3. Reference sign B in FIG. 4 indicates an intersection of an endpoint of CCD 110 and light range L30. Details of these intersections A and B are described with reference to FIG. 5.

In a general optical system, light quantity to be captured decreases as a distance from a center of an imaging element increases. Specifically in FIG. 4, light quantity gradually decreases in an upward vertical direction from the center of the optical axis indicated by an alternate long and short dash line along CCD 110 toward L30 and then L3. Light quantity gradually decreases in a downward vertical direction from the center of the optical axis indicated by the alternate long and short dash line along CCD 110 toward L40 and then L4.

FIG. 5 is a principle diagram of the peripheral light quantity drop in digital camera 1 according to the first exemplary embodiment. In FIG. 5, (b) illustrates a characteristic graph of the peripheral light quantity drop. In (a) of FIG. 5, reference sign C indicates light quantity distribution of the subject image on the CCD 110 side through zoom lens 210, OIS lens 220, and focus lens 230, whereas reference sign D indicates an external form of CCD 110. Light quantity distribution C of the subject image on the CCD 110 side is called an effective image circle, and outside this effective image circle, so-called vignetting occurs, which is a phenomenon where appropriate light quantity is not obtained. Point A at which an alternate long and short dash line and an external form of light quantity distribution C intersect corresponds to intersection A in FIG. 4 described above. Point B at which the alternate long and short dash line and an external form D of CCD 110 intersect corresponds to intersection B in FIG. 4 described above.

In (b) of FIG. 5, a horizontal axis represents an image height and corresponds to coordinates along the alternate long and short dash line in (a) of FIG. 5. A vertical axis represents a peripheral light quantity ratio. When it is defined that the image height is 0 and the peripheral light quantity ratio is 1.0 at a center of light quantity distribution C in (a) of FIG. 5, (b) of FIG. 5 indicates a characteristic that the peripheral light quantity decreases as the image height along the alternate long and short dash line in (a) of FIG. 5 increases. It is defined here that the image height is 1.0 at point B at which the alternate long and short dash line of (a) of FIG. 5 and external form D of CCD 110 intersect. A region outside intersection A (region where the image height exceeds 1.2) indicates a region where vignetting occurs and normal light quantity is not obtained, and this region is omitted in the characteristic graph of (b) of FIG. 5. In the characteristic graph of the peripheral light quantity drop in (b) of FIG. 5, as a specific example, the peripheral light quantity ratio is 0.5 when the image height is 1.0, whereas the peripheral light quantity ratio is 0.35 when the image height is 1.2. The characteristic graph of the peripheral light quantity drop has a bilaterally symmetrical shape centered at the image height of 0. On a left side of the image height of 0, coordinates are negative, and (b) of FIG. 5 indicates the characteristic graph when the image height ranges from −1.2 to 0.

Figure 6A:
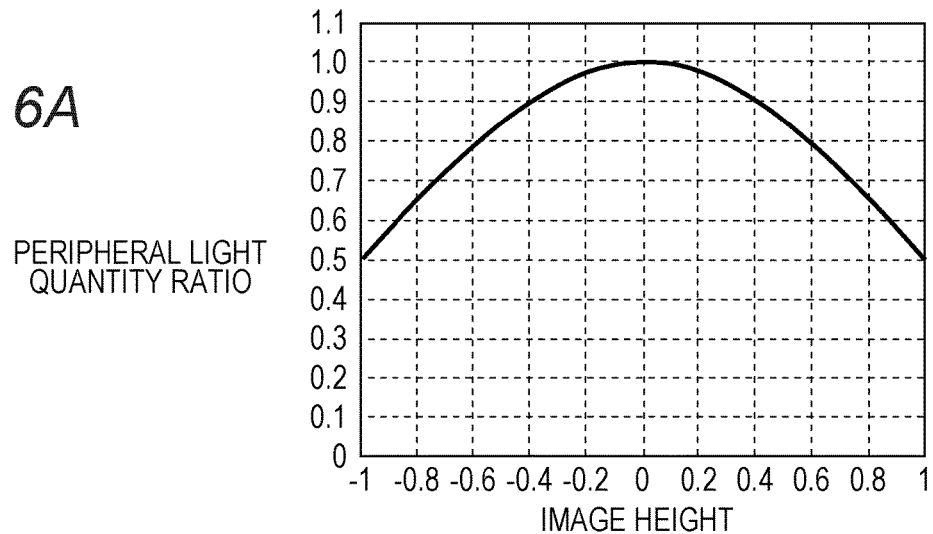
FIG. 6A is a characteristic graph of the peripheral light quantity drop in the digital camera according to the first exemplary embodiment.
Figure 6B:
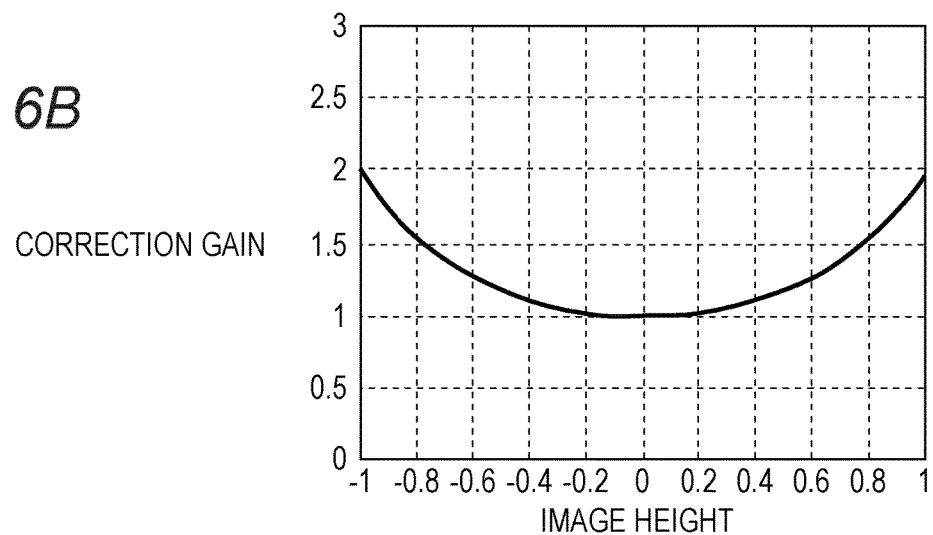
FIG. 6B is a characteristic graph of a peripheral light quantity correction gain in the digital camera according to the first exemplary embodiment.
Figure 6C:
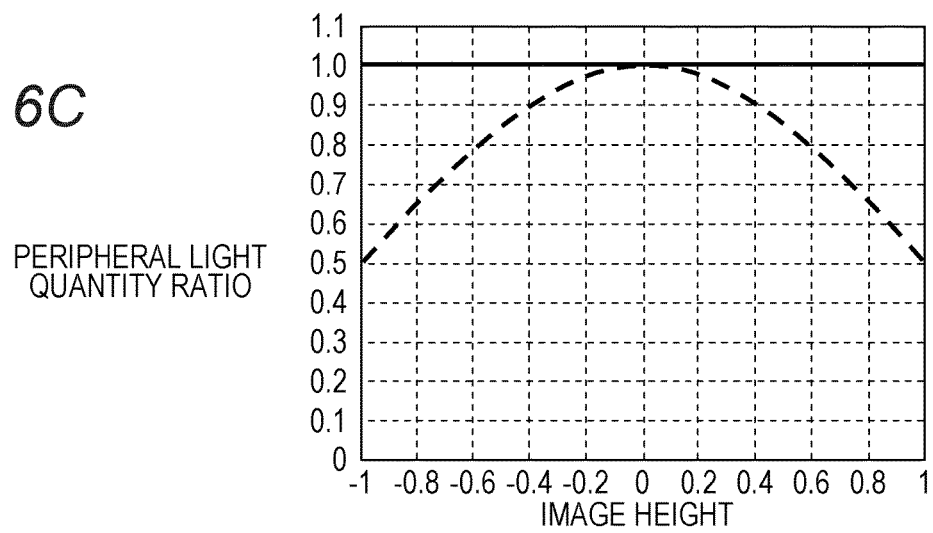
FIG. 6C is a characteristic graph after peripheral light quantity correction in the digital camera according to the first exemplary embodiment.

Next, a specific example of performing peripheral light quantity correction will be described with reference to FIG. 6A, FIG. 6B, and FIG. 6C. FIG. 6A is a characteristic graph of the peripheral light quantity drop in digital camera 1 according to the first exemplary embodiment. FIG. 6B is a characteristic graph of a peripheral light quantity correction gain in digital camera 1 according to the first exemplary embodiment. FIG. 6C is a characteristic graph after the peripheral light quantity correction in digital camera 1 according to the first exemplary embodiment. Although FIG. 6A is identical to the characteristic graph of the peripheral light quantity drop of (b) of FIG. 5 described above, FIG. 6A is a graph limited to light quantity projected on CCD 110, and thus the image height of the horizontal axis is limited to a range from −1.0 to 1.0. FIG. 6B illustrates the characteristic graph of the peripheral light quantity correction gain when the peripheral light quantity correction is performed depending on the characteristic of the peripheral light quantity drop of FIG. 6A. Camera controller 140 in FIG. 1 corrects the peripheral light quantity by increasing the gain of image data that is input into camera controller 140 through CCD 110 and ADC 111 in response to the image height and correction gain. FIG. 6C illustrates an example in which it becomes possible to correct the peripheral light quantity ratio to 1.0 regardless of the image height by multiplying the characteristic of the peripheral light quantity drop of FIG. 6A by the characteristic of the peripheral light quantity correction gain of FIG. 6B for each image height. In FIG. 6C, by the correction, the characteristic graph of the peripheral light quantity drop illustrated by a dashed line (identical to the characteristic graph of FIG. 6A) becomes the characteristic graph after the peripheral light quantity correction illustrated by a solid line.

2-3. Principle of Peripheral Light Quantity Correction in Hand-Shake Correction System The following describes a specific exemplary embodiment for solving a problem that quality of an image obtained by capturing the subject image projected on CCD 110 decreases because light quantity further decreases with the distance from the center of CCD 110 increases, by shifting the correction lens (hereinafter referred to as an OIS lens) or shifting the imaging element (hereinafter referred to as a CCD).

2-3-1. Principle of Peripheral Light Quantity Characteristic by OIS Lens Shift

Figure 7A:
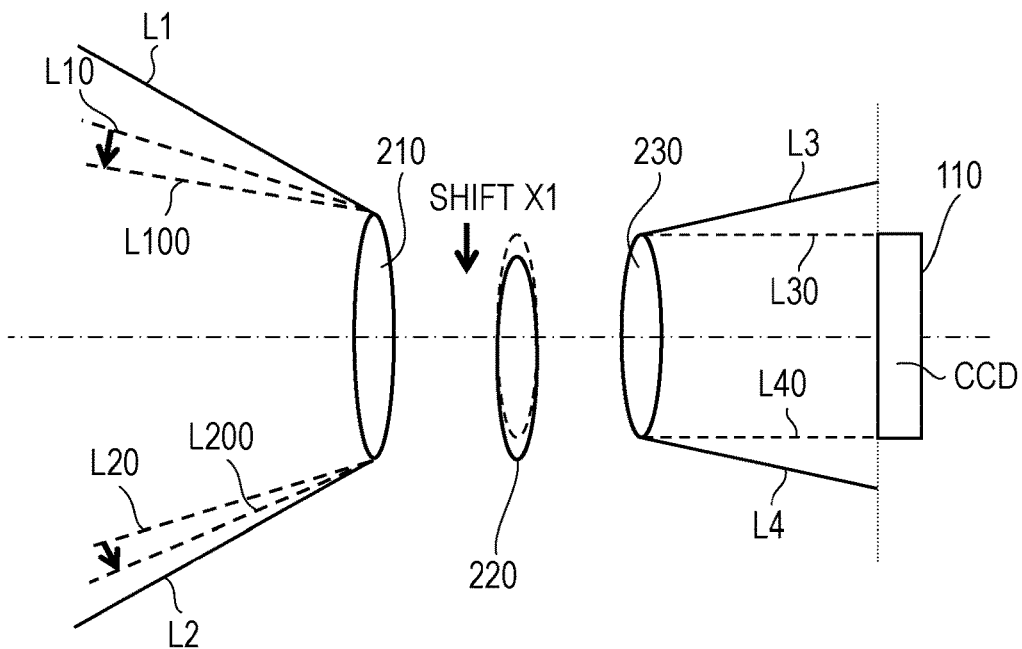
FIG. 7A is a diagram illustrating a principle of peripheral light quantity characteristic when an OIS lens is shifted in the digital camera according to the first exemplary embodiment.
Figure 7B:
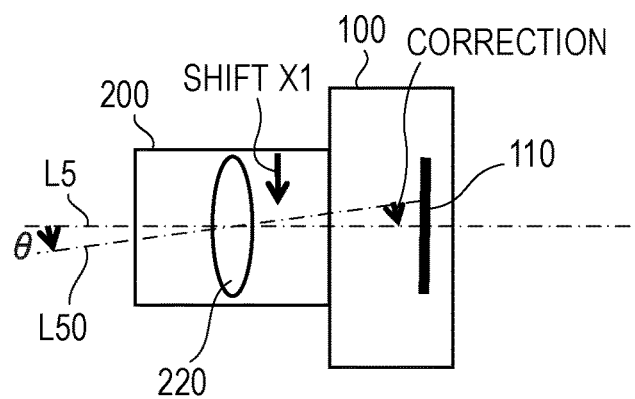
FIG. 7B is a hand-shake correction principle diagram caused by OIS lens shift in the digital camera according to the first exemplary embodiment.

FIG. 7A is a diagram illustrating a principle of the peripheral light quantity characteristic when OIS lens 220 is shifted in digital camera 1 according to the first exemplary embodiment. FIG. 7B is a hand-shake correction principle diagram implemented by the OIS lens 220 shift. FIG. 7B describes only requirements which are points of description of digital camera 1 in which camera body 100 includes CCD 110 and interchangeable lens 200 includes OIS lens 220. When it is assumed that digital camera 1 rotates by θ around OIS lens 220 due to hand shake, optical axis L5 rotates by θ to L50 around OIS lens 220. In this case, by shifting OIS lens 220 by X1 in response to rotation θ of digital camera 1 caused by hand shake, digital camera 1 performs correction so as to cause rotated optical axis L50 to agree with optical axis L5 on a right side of OIS lens 220. This allows the subject image to be formed on CCD 110 without blur even when digital camera 1 rotates due to hand shake. As one example, when focal length f of interchangeable lens 200 is 150 mm and rotation θ caused by hand shake of digital camera 1 is 0.3 degrees, rotation of optical axis L5 to L50 causes an image formation position to deviate by about 0.78 mm on CCD 110. Therefore, shifting OIS lens 220 allows this deviation of the image formation position to be corrected. Although a shift amount of OIS lens 220 in this case is dependent on optical design, for example, by causing the image formation position to return by the deviation of 0.78 mm when shift amount X1 is 0.3 mm, the hand-shake correction function can be implemented.

In FIG. 7A, OIS lens 220 has a function to correct hand shake by shifting perpendicularly to the optical axis. When OIS lens 220 is held at the center, L1 and L2 each indicate the boundary of the light range in which the subject image can be caught. The light range indicated by L1 and L2 in which the subject image is caught corresponds to the light range indicated by L3 and L4 on the CCD 110 side. In contrast, L30 and L40 on the CCD 110 side each indicate the boundary of the light range captured by CCD 110, and the light range corresponds to the light range indicated by L10 and L20 on the subject side (left side of zoom lens 210). As described with reference to FIG. 7B, when digital camera 1 rotates by θ around OIS lens 220 due to hand shake, shifting OIS lens 220 by X1 perpendicularly to the optical axis makes it possible to correct the deviation of the image formation position of the subject image on CCD 110 caused by hand shake. At this time, boundaries L10 and L20 of the light range on the subject side (left side of zoom lens 210) move to L100 and L200 as illustrated, respectively, the light range corresponding to the light range indicated by L30 and L40 projected on CCD 110. Thus, since the light range on the subject side is moved by the hand-shake correction implemented by shift of OIS lens 220, L20 moves to L200 and approaches boundary L2 of the light range in which the subject can be caught, leading to slight decrease in light quantity of corresponding light L30 on the CCD 110 side. In contrast, L10 moves to L100 and goes away from boundary L1 of the light range in which the subject can be caught, leading to slight increase in light quantity of corresponding light L40 on the CCD 110 side.

2-3-2. Principle of Peripheral Light Quantity Characteristic by CCD Shift

Figure 8A:
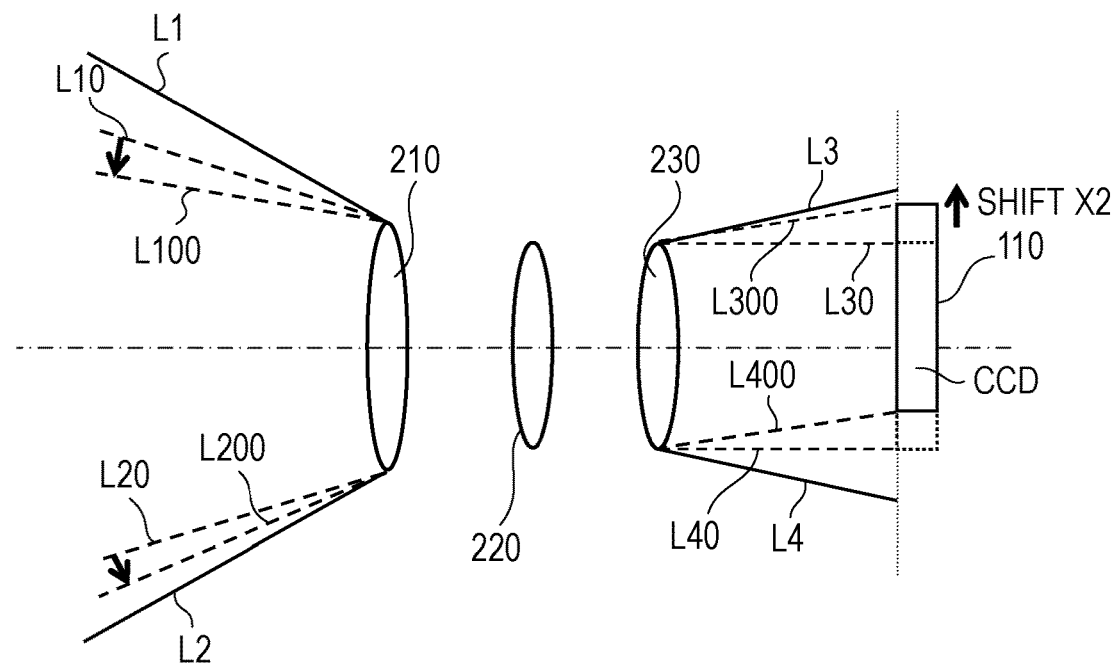
FIG. 8A is a diagram illustrating the principle of the peripheral light quantity characteristic when a CCD is shifted in the digital camera according to the first exemplary embodiment.
Figure 8B:
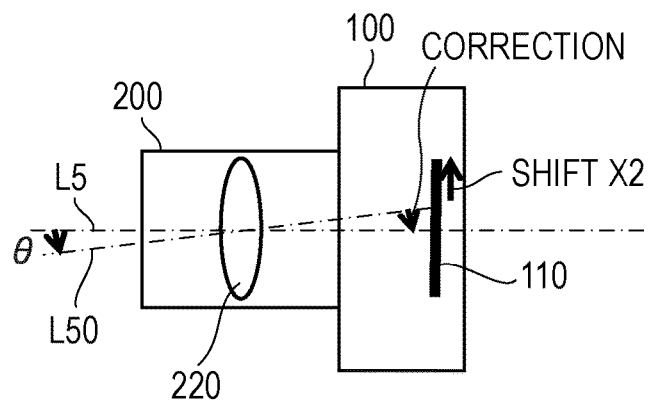
FIG. 8B is a hand-shake correction principle diagram caused by CCD shift in the digital camera according to the first exemplary embodiment.

FIG. 8A is a diagram illustrating a principle of the peripheral light quantity characteristic when the CCD is shifted in digital camera 1 according to the first exemplary embodiment. FIG. 8B is a principle diagram of the hand-shake correction implemented by CCD shift in digital camera 1 according to the first exemplary embodiment. FIG. 8B describes only requirements which are points of description of digital camera 1 in which camera body 100 includes CCD 110 and interchangeable lens 200 includes OIS lens 220. When it is assumed that digital camera 1 rotates by θ around OIS lens 220 due to hand shake, optical axis L5 rotates by θ to L50 around OIS lens 220. In this case, by shifting CCD 110 by X2 in response to rotation θ of digital camera 1 caused by hand shake, digital camera 1 performs correction so as to cause an intersection coordinate of optical axis L5 with CCD 110 to agree with an intersection coordinate of optical axis L50 with CCD 110. This allows the subject image to be formed on CCD 110 without blur even when digital camera 1 rotates due to hand shake. As one example, when focal length f of interchangeable lens 200 is 150 mm and rotation θ caused by hand shake of digital camera 1 is 0.3 degrees, rotation of optical axis L5 to L50 causes an image formation position to deviate by about 0.78 mm on CCD 110. Therefore, shifting CCD 110 by about 0.78 mm allows this deviation of the image formation position to be corrected.

In FIG. 8A, CCD 110 has a function to correct hand shake by shifting perpendicularly to the optical axis. However, when CCD 110 is held at the center, L1 and L2 each indicate the boundary of the light range in which the subject image can be caught. The light range indicated by L1 and L2 in which the subject image is caught corresponds to the light range indicated by L3 and L4 on the CCD 110 side. In contrast, L30 and L40 on the CCD 110 side each indicate the boundary of the light range captured by CCD 110, and the light range indicated by L30 and L40 corresponds to the light range indicated by L10 and L20 on the subject side (left side of zoom lens 210). As described with reference to FIG. 8B, when digital camera 1 rotates by θ around OIS lens 220 due to hand shake, shifting CCD 110 by X2 perpendicularly to the optical axis makes it possible to correct the deviation of the image formation position of the subject image on CCD 110 caused by hand shake. Before CCD 110 is shifted, L30 and L40, which are the boundaries of the light range to be projected on CCD 110, correspond to L10 and L20, which are the boundaries of the light range on the subject side (left side of zoom lens 210). After CCD 110 is shifted by X2, L300 and L400, which are the boundaries of the light range to be projected on CCD 110, correspond to L100 and L200, which are the boundaries of the light range on the subject side (left side of zoom lens 210). The light range indicated by L100 and L200 is similar to the range at a time of hand-shake correction implemented by shift of OIS lens 220 described above. That is, when rotation caused by hand shake of digital camera 1 is θ, angles of view to be caught on the subject side are identical to each other. Again, in the light range on the subject side (left side of zoom lens 210), L10 moves to L100 and goes away from L1, which is the boundary of the light range in which the subject can be caught, leading to slight increase in light quantity of light L100 projected on the CCD 110 side. Meanwhile, in the light range on the subject side (left side of zoom lens 210), L20 moves to L200 and approaches L2, which is the boundary of the light range in which the subject can be caught. Accordingly, light quantity of light L200 projected on the CCD 110 side decreases slightly. After CCD 110 is shifted by X2, L300, which is the boundary of the light range to be projected on CCD 110, approaches light L3 corresponding to the external form of the effective image circle, and thus light quantity of light L300 to be projected on CCD 110 further decreases. That is, in addition to decrease in light quantity that enters interchangeable lens 200 due to light L200, light quantity of light L300 corresponding to light L200 further decreases. Meanwhile, after CCD 110 is shifted by X2, L400, which is the boundary of the light range to be projected on CCD 110, goes away from light L4 corresponding to the external form of the effective image circle. Accordingly, light quantity of light L400 to be projected on CCD 110 further increases. That is, in addition to increase in light quantity that enters interchangeable lens 200 due to light L100, light quantity of light L400 corresponding to light L100 further increases.

Therefore, in a region in which the peripheral light quantity is decreased by shift of the OIS lens or CCD caused by hand-shake correction, the peripheral light quantity will be decreased more when the CCD is shifted than when the OIS lens is shifted. In contrast, in a region in which the peripheral light quantity is increased by shift of the OIS lens or CCD caused by hand-shake correction, the peripheral light quantity will be increased more when the CCD is shifted than when the OIS lens is shifted.

Figure 9A:
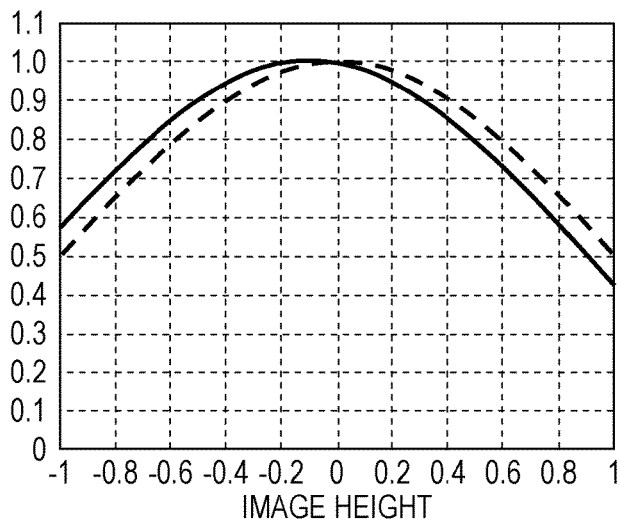
FIG. 9A is a peripheral light quantity characteristic graph after OIS lens shift in the digital camera according to the first exemplary embodiment.
Figure 9B:
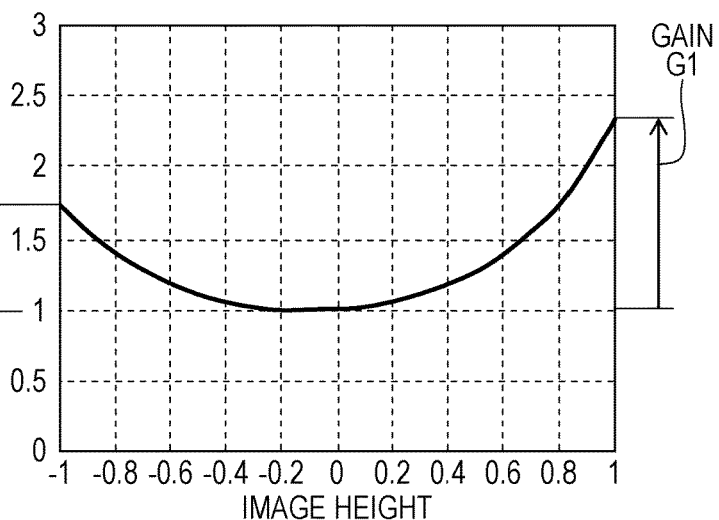
FIG. 9B is a characteristic graph of a peripheral light quantity correction gain after OIS lens shift in the digital camera according to the first exemplary embodiment.
Figure 9C:
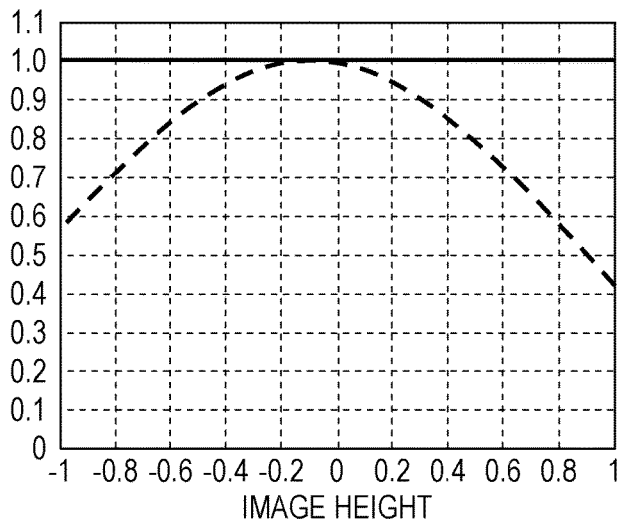
FIG. 9C is a characteristic graph after the peripheral light quantity correction after OIS lens shift in the digital camera according to the first exemplary embodiment.

2-3-3. Method for Correcting Peripheral Light Quantity Characteristic Caused by OIS Lens Shift A specific example of correcting a change in the peripheral light quantity characteristic caused by OIS lens shift will be described with reference to FIG. 9A, FIG. 9B, and FIG. 9C. FIG. 9A is a peripheral light quantity characteristic graph after OIS lens shift in digital camera 1 according to the first exemplary embodiment. FIG. 9B is a characteristic graph of the peripheral light quantity correction gain after OIS lens shift in digital camera 1 according to the first exemplary embodiment. FIG. 9C is a characteristic graph after the peripheral light quantity correction after OIS lens shift in digital camera 1 according to the first exemplary embodiment.

In FIG. 9A, a horizontal axis represents the image height of 0 at a center on CCD 110 and the image height of between −1.0 and 1.0 at corners on CCD 110. A vertical axis represents the peripheral light quantity ratio corresponding to the image height. The graph of a dashed line is a graph representing the peripheral light quantity characteristic before OIS lens shift. The graph of a solid line is a graph representing the peripheral light quantity characteristic after OIS lens shift, that is, when the OIS lens is shifted by X1 perpendicularly to the optical axis. As described above, this graph indicates that, due to OIS lens shift, the peripheral light quantity slightly decreases from the peripheral light quantity before OIS lens shift when the image height is 1.0. This graph also indicates that the peripheral light quantity slightly increases from the peripheral light quantity before OIS lens shift when the image height is −1.0.

FIG. 9B illustrates the characteristic graph of the peripheral light quantity correction gain when peripheral light quantity correction is performed depending on the characteristic of the peripheral light quantity drop of FIG. 9A. FIG. 9B, which illustrates an example of performing the peripheral light quantity correction after OIS lens shift, corresponds to the graph illustrated by the solid line of FIG. 9A. Camera controller 140 corrects the peripheral light quantity by increasing the gain of image data that is input into camera controller 140 through CCD 110 and ADC 111 in response to the image height and correction gain. FIG. 9C illustrates the peripheral light quantity ratio to correct the peripheral light quantity ratio to 1.0 regardless of the image height by multiplying the characteristic of the peripheral light quantity drop illustrated by the solid line of FIG. 9A by the characteristic of the peripheral light quantity correction gain of FIG. 9B for each image height. In FIG. 9C, by the correction, the characteristic graph of the peripheral light quantity drop illustrated by the dashed line (identical to the characteristic graph illustrated by the solid line of FIG. 9A) becomes the characteristic graph after the peripheral light quantity correction illustrated by the solid line.

In FIG. 9B, the gain at the image height of 1.0 is defined as G1, while the gain at the image height of −1.0 is defined as G2. Gain G1 and gain G2 are used in description of the method for correcting the peripheral light quantity characteristic implemented by CCD shift to be described later.

Figure 10A:
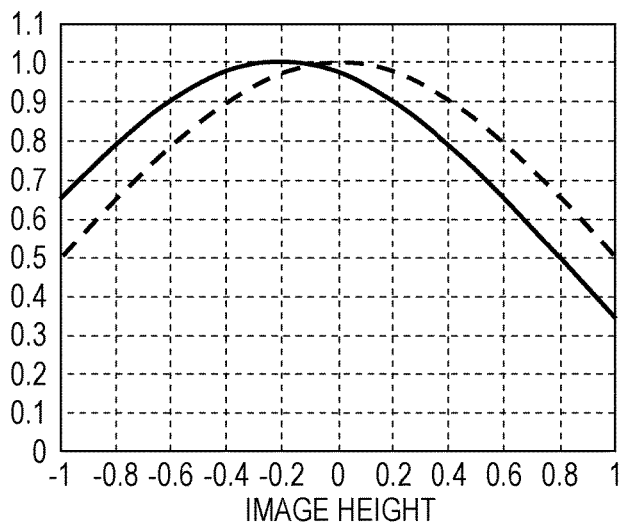
FIG. 10A is a peripheral light quantity characteristic graph after CCD shift in the digital camera according to the first exemplary embodiment.
Figure 10B:
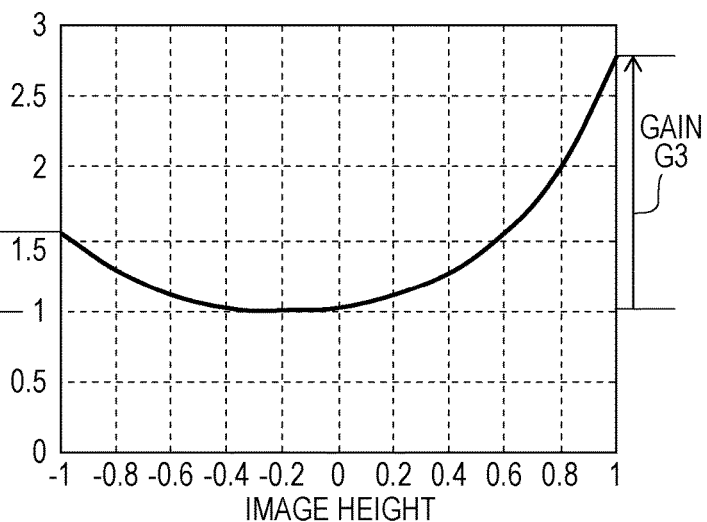
FIG. 10B is a characteristic graph of the peripheral light quantity correction gain after CCD shift in the digital camera according to the first exemplary embodiment.
Figure 10C:
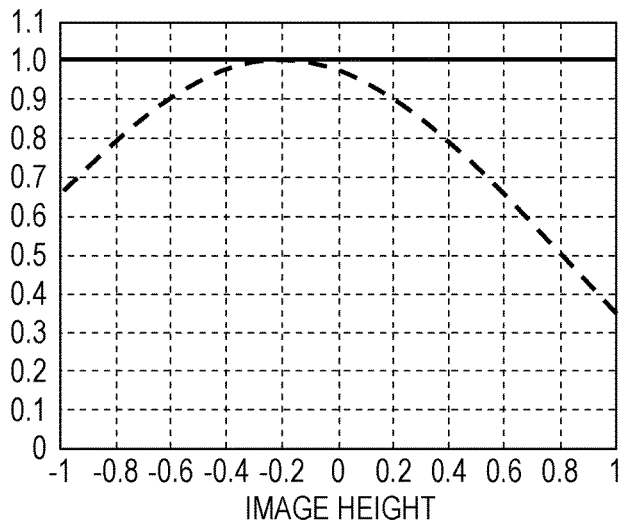
FIG. 10C is a characteristic graph after the peripheral light quantity correction after CCD shift in the digital camera according to the first exemplary embodiment.

2-3-4. Method for Correcting Peripheral Light Quantity Characteristic Caused by CCD Shift A specific example of correcting a change in the peripheral light quantity characteristic caused by CCD shift will be described with reference to FIG. 10A, FIG. 10B, and FIG. 10C. FIG. 10A is a peripheral light quantity characteristic graph after CCD shift in digital camera 1 according to the first exemplary embodiment. FIG. 10B is a characteristic graph of the peripheral light quantity correction gain after CCD shift in digital camera 1 according to the first exemplary embodiment. FIG. 10C is a characteristic graph after the peripheral light quantity correction after CCD shift in digital camera 1 according to the first exemplary embodiment.

In FIG. 10A, a horizontal axis represents the image height of 0 at the center on CCD 110 and the image height of between −1.0 and 1.0 at the corners on CCD 110. A vertical axis represents the peripheral light quantity ratio corresponding to the image height. The graph of a dashed line is a graph representing the peripheral light quantity characteristic before CCD shift. The graph of a solid line is a graph representing the peripheral light quantity characteristic after CCD shift, that is, when the CCD is shifted by X2 perpendicularly to the optical axis. As described above, this graph indicates that, due to CCD shift, the peripheral light quantity decreases from the peripheral light quantity before CCD shift when the image height is 1.0. This graph also indicates that the peripheral light quantity slightly increases from the peripheral light quantity before CCD shift when the image height is −1.0. In particular, a comparison between FIG. 10A and FIG. 9A indicates that, at the image height of 1.0, the peripheral light quantity decreases more largely after CCD shift than after OIS lens shift with respect to the peripheral light quantity before CCD shift or before OIS lens shift. The comparison between FIG. 10A and FIG. 9A indicates that, at the image height of −1.0, the peripheral light quantity increases more largely after CCD shift than after OIS lens shift with respect to the peripheral light quantity before CCD shift or before OIS lens shift.

FIG. 10B illustrates the characteristic graph of the peripheral light quantity correction gain when the peripheral light quantity correction is performed depending on the characteristic of the peripheral light quantity drop of FIG. 10A. FIG. 10B, which illustrates an example of performing the peripheral light quantity correction after CCD shift, corresponds to the graph illustrated by the solid line of FIG. 10A. Camera controller 140 corrects the peripheral light quantity by increasing the gain of image data that is input into camera controller 140 through CCD 110 and ADC 111 in response to the image height and correction gain. FIG. 10C illustrates the peripheral light quantity ratio to correct the peripheral light quantity ratio to 1.0 regardless of the image height by multiplying the characteristic of the peripheral light quantity drop illustrated by the solid line of FIG. 10A by the characteristic of the peripheral light quantity correction gain of FIG. 10B for each image height. In FIG. 10C, by the correction, the characteristic graph of the peripheral light quantity drop illustrated by the dashed line (identical to the characteristic graph illustrated by the solid line of FIG. 10A) becomes the characteristic graph after the peripheral light quantity correction illustrated by the solid line.

In FIG. 10B, the gain at the image height of 1.0 is defined as G3, while the gain at the image height of −1.0 is defined as G4. Magnitude of the gains G1 and G2 defined in FIG. 9B and the gains G3 and G4 defined in FIG. 10B are compared. When the image height is 1.0, a relationship of G3>G1 is satisfied. When the image height is −1.0, a relationship of G 4<G2 is satisfied. That is, when the image height is 1.0, with respect to identical hand-shake rotation θ of digital camera 1, the peripheral light quantity drops more after the CCD shift than after the OIS lens shift. Accordingly, as a result, the peripheral light quantity correction gain is set so as to be larger at the time of CCD shift than at the time of OIS lens shift. Meanwhile, when the image height is −1.0, with respect to identical hand-shake rotation θ of digital camera 1, the peripheral light quantity drops less after the CCD shift than after the OIS lens shift. Accordingly, as a result, the peripheral light quantity correction gain is set so as to be smaller at the time of CCD shift than at the time of OIS lens shift.

3. Summary

The present exemplary embodiment indicates a specific example that can properly correct decrease in the peripheral light quantity at one corner of the CCD and decrease in the peripheral light quantity at another corner of the CCD, prevent decrease in quality of captured images, and provide good captured images.

Digital camera 1 has been described that performs hand-shake correction by shifting OIS lens 220 and CCD 110 in order to reduce influence of hand shake on captured images during capturing due to hand shake. By shifting OIS lens 220 for a certain hand-shake amount, the peripheral light quantity on CCD 110 drops compared with a case where the hand-shake correction is not performed. However, by shifting CCD 110 for the same hand-shake amount, the peripheral light quantity on CCD 110 drops more. Accordingly, in this case, by making the peripheral light quantity correction caused by CCD shift larger than the peripheral light quantity correction caused by OIS lens shift, it is possible to solve decrease in image quality due to hand shake and peripheral light quantity drop in captured images.

In contrast, by shifting OIS lens 220 for a certain hand-shake amount, the peripheral light quantity on CCD 110 may increase as compared with a case where the hand-shake correction is not performed. However, by shifting CCD 110 for the same hand-shake amount, the peripheral light quantity on CCD 110 increases more. Accordingly, in this case, by making the peripheral light quantity correction caused by CCD shift smaller than the peripheral light quantity correction caused by OIS lens shift, it is possible to solve decrease in image quality due to hand shake and peripheral light quantity drop in captured images.

In particular, combination of both these methods allows reduction in right and left difference of the peripheral light quantity drop in captured images, providing images with higher quality.

That is, by changing the peripheral light quantity correction amount for a certain hand-shake amount, digital camera 1 can solve decrease in image quality caused by hand shake and peripheral light quantity drop in captured images when switching from correction by OIS lens shift to correction by CCD shift, or when switching from correction by CCD shift to correction by OIS lens shift.

As described above, an image pickup device corresponding to digital camera 1 of the present exemplary embodiment includes an optical system including a plurality of lenses 210, 220, 230, an imaging element corresponding to CCD 110 that captures a subject image formed by the optical system, and a peripheral light quantity correction unit that corrects the peripheral light quantity of an image captured by the imaging element. In addition, the image pickup device corresponding to digital camera 1 includes a shake detector corresponding to gyro sensors 184, 224 that detect shake of the image pickup device, and a drive controller corresponding to CCD 110 or OIS lens 220 that moves at least one of lenses 210, 220, 230 and the imaging element on the plane perpendicular to the optical axis in response to an output signal of the shake detector to correct shake. In addition, the peripheral light quantity correction unit extracts a predetermined frequency component of shake, and changes the correction amount of the peripheral light quantity in response to the predetermined frequency component of shake.

This allows the image pickup device to prevent decrease in quality of captured images due to decrease in peripheral light quantity projected on the imaging element, providing good captured images. In particular, this allows the image pickup device to prevent decrease in quality of captured images during capturing of moving images, providing good captured moving images.

The peripheral light quantity correction unit may extract the predetermined frequency component of the shake from the output signal of the shake detector, and change the correction amount of the peripheral light quantity in response to the predetermined frequency component of the shake. This allows the image pickup device to prevent decrease in quality of captured images due to decrease in peripheral light quantity projected on the imaging element, providing good captured images.

The peripheral light quantity correction unit may extract the predetermined frequency component of the shake from a drive control signal to move at least one of the lens and the imaging element in the drive controller, and then the peripheral light quantity correction unit may change the correction amount of the peripheral light quantity in response to the predetermined frequency component of the shake. This allows the image pickup device to prevent decrease in quality of captured images due to decrease in peripheral light quantity projected on the imaging element, providing good captured images.

The image pickup device may include interchangeable lens 200 including the optical system, and camera body 100 including the imaging element and the peripheral light quantity correction unit. Interchangeable lens 200 and camera body 100 may be detachable.

The optical system may include a correction lens corresponding to OIS lens 220 for correcting shake.

Second Exemplary Embodiment

1. Configuration

Another example of a digital camera that implements shake correction will be described. A configuration and basic operation of the digital camera according to the present exemplary embodiment are identical to a configuration and basic operation according to the first exemplary embodiment. In the digital camera according to the present exemplary embodiment, various operations for improving correction performance of peripheral light quantity during capturing of a moving image are newly added to camera controller 140 and lens controller 240.

2. Operation 2-1. Shake Correction Process

In the present exemplary embodiment, a basic principle of the shake correction process described in the first exemplary embodiment is identical, and thus detailed description of the principle will be omitted. In the present exemplary embodiment, in order to make a plain description, in addition to the process for shifting CCD 110 to perform shake correction, a detailed operation of performing a peripheral light quantity correction process will be described. Meanwhile, the process for performing peripheral light quantity correction in addition to the process for shifting OIS lens 220 to perform shake correction has a similar effect to the process for performing peripheral light quantity correction in addition to the process for shifting CCD 110 to perform shake correction. Also, the process for performing peripheral light quantity correction also has a similar effect by performing both the process for shifting CCD 110 to perform shake correction and the process for shifting OIS lens 220 to perform shake correction.

According to the present exemplary embodiment, a new process for improving correction performance of peripheral light quantity is added to camera controller 140 and lens controller 240. Detailed description of the new process will be provided in and after Paragraph 2-3.

2-2. Method for Correcting Peripheral Light Quantity Characteristic in Hand-Shake Correction Operation (Example for Reference)

The method for correcting the peripheral light quantity characteristic in the hand-shake correction operation in the example for reference will be described with reference to FIG. 11A, FIG. 11B, FIG. 12A, FIG. 12B, FIG. 12C, FIG. 13A, FIG. 13B, and FIG. 13C.

Figure 11A:
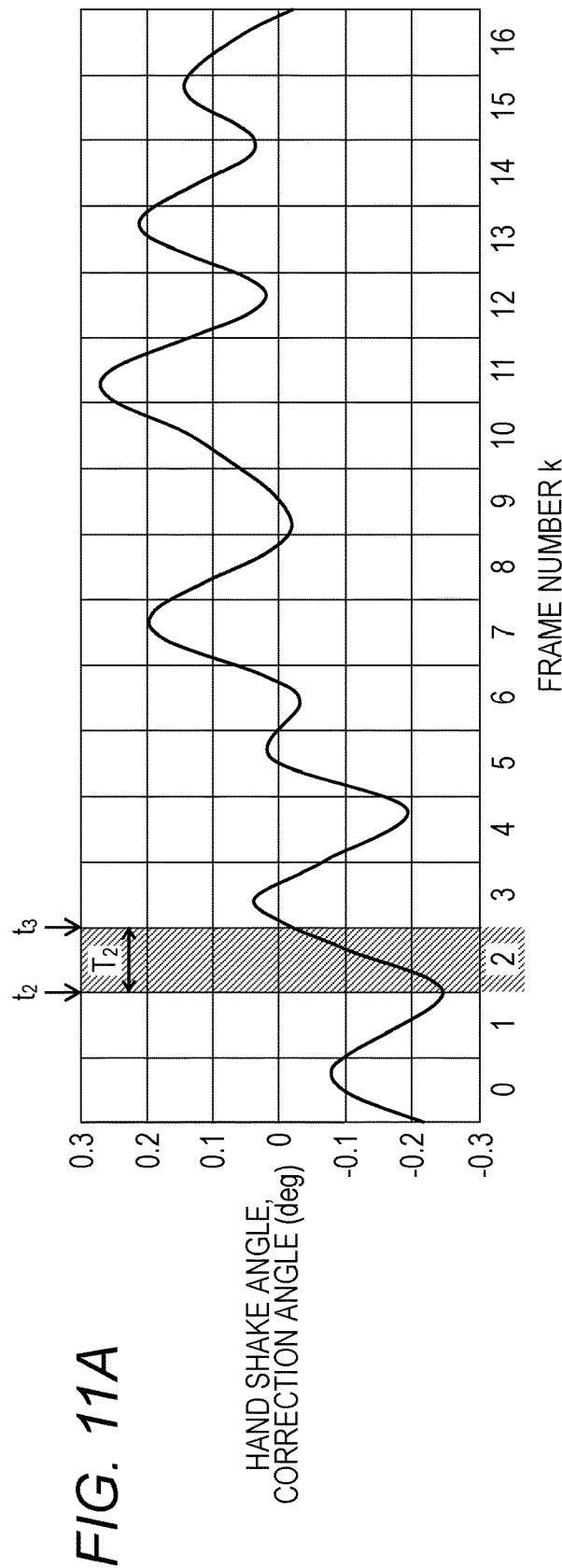
FIG. 11A is a waveform chart of a shake detection signal and a hand-shake control signal in a shake correction process according to a second exemplary embodiment.

FIG. 11A is a waveform chart of a shake detection signal and a hand-shake control signal in the shake correction process according to the second exemplary embodiment. A horizontal axis represents frame number k (where k=0, 1, 2, 3 . . . ), whereas a vertical axis represents a hand-shake angle and a correction angle. Frame number k is incremented, for example, every 1/30 seconds. The hand-shake angle is calculated based on output of gyro sensor 184 (output of integrator 408) provided in camera body 100. The correction angle is calculated based on output of position sensor 182 provided in camera body 100. FIG. 11A illustrates an example of the hand-shake angle and the correction angle at frame number k from 0 to 16 (about 567 ms). Strictly speaking, characteristics differ from each other between the hand-shake angle and the correction angle due to a residual error, response delay, and the like, and thus there is an error therebetween. However, since the error is small, the hand-shake angle and the correction angle are regarded as almost identical characteristics and are superimposed in graphs.

Figure 12A:
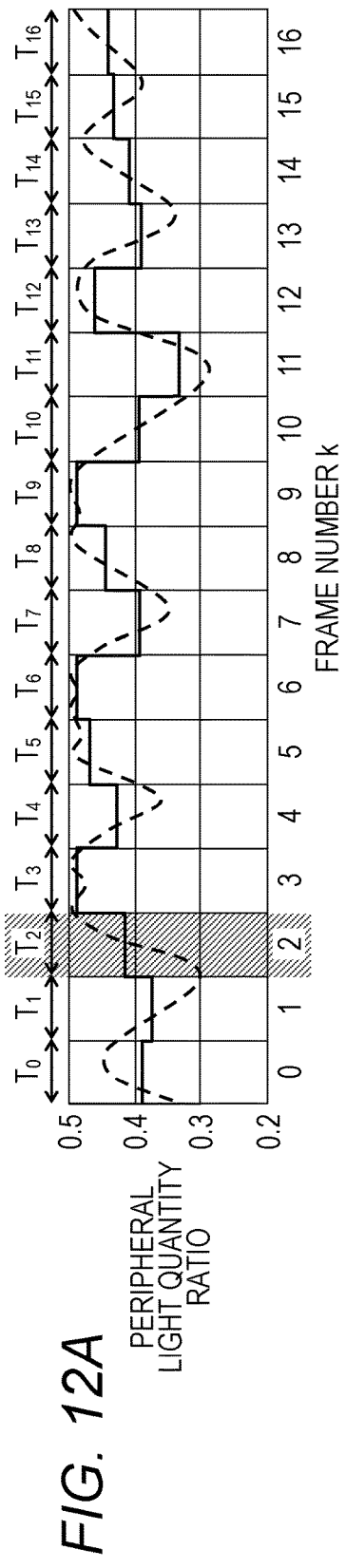
FIG. 12A is a waveform chart illustrating temporal variation of the peripheral light quantity ratio before the peripheral light quantity correction updated every exposure time Tk in the shake correction process of the example for reference.

FIG. 12A is a waveform chart illustrating temporal variation of a peripheral light quantity ratio before peripheral light quantity correction updated every exposure time Tk in the shake correction process of the example for reference. A horizontal axis represents frame number k (where k=0, 1, 2, 3 . . . ), whereas a vertical axis represents the peripheral light quantity ratio. Frame number k is incremented, for example, every 1/30 seconds. The graph indicated by a dashed line of FIG. 12A represents real-time transition of the peripheral light quantity ratio before the peripheral light quantity correction in the hand-shake correction operation. The stepwise graph indicated by a solid line of FIG. 12A represents transition of the peripheral light quantity ratio before the peripheral light quantity correction in the hand-shake correction operation. Here, the peripheral light quantity ratio in FIG. 12A represents the peripheral light quantity ratio corresponding to the image height of 1.0 on CCD 110.

Figure 13A:
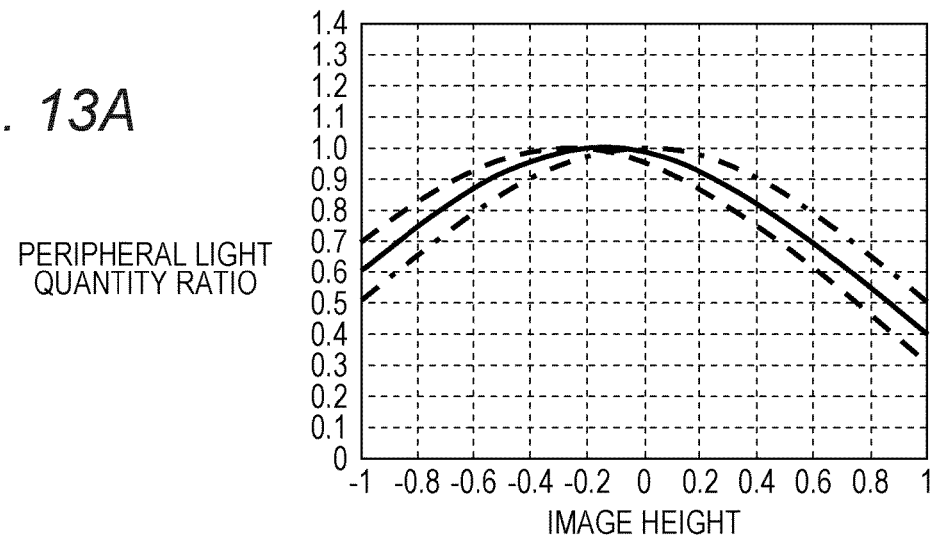
FIG. 13A is a characteristic graph of the peripheral light quantity ratio before the peripheral light quantity correction during CCD shift of exposure period T2 in the digital camera of the example for reference.

FIG. 13A illustrates the peripheral light quantity ratio before the peripheral light quantity correction corresponding to the image height with the image height of 0 at a center on CCD 110 and the image height of between −1.0 and 1.0 at corners on CCD 110. FIG. 11A and FIG. 12A described above each illustrate the peripheral light quantity ratio before the peripheral light quantity correction during exposure period T2 at frame number k=2 in a shaded region. In FIG. 13A, the graph of a dashed line is a graph representing the peripheral light quantity characteristic before the peripheral light quantity correction at time t2 in FIG. 11A. In FIG. 13A, the graph of an alternate long and short dash line is a graph representing the peripheral light quantity characteristic before the peripheral light quantity correction at time t3 in FIG. 11A. In FIG. 13A, the graph of a solid line is a graph representing the peripheral light quantity characteristic before the peripheral light quantity correction in FIG. 11A.

Figure 11B:
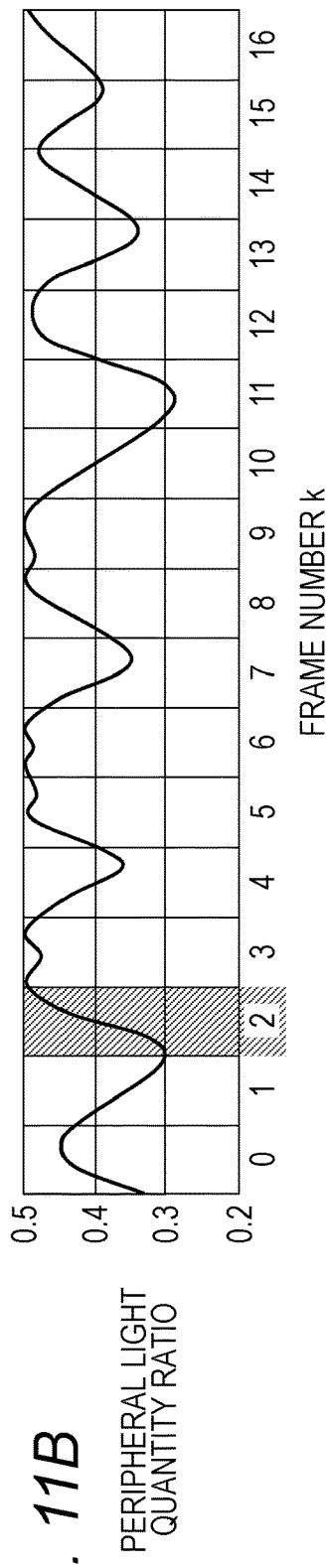
FIG. 11B is a waveform chart illustrating temporal variation of a peripheral light quantity ratio before peripheral light quantity correction in the shake correction process according to the second exemplary embodiment.

FIG. 11B is a waveform chart illustrating temporal variation of the peripheral light quantity ratio before the peripheral light quantity correction in the shake correction process according to the second exemplary embodiment. FIG. 11B represents real-time transition of the peripheral light quantity ratio before the peripheral light quantity correction corresponding to the image height of 1.0 on CCD 110 in the hand-shake correction operation.

Figure 12B:
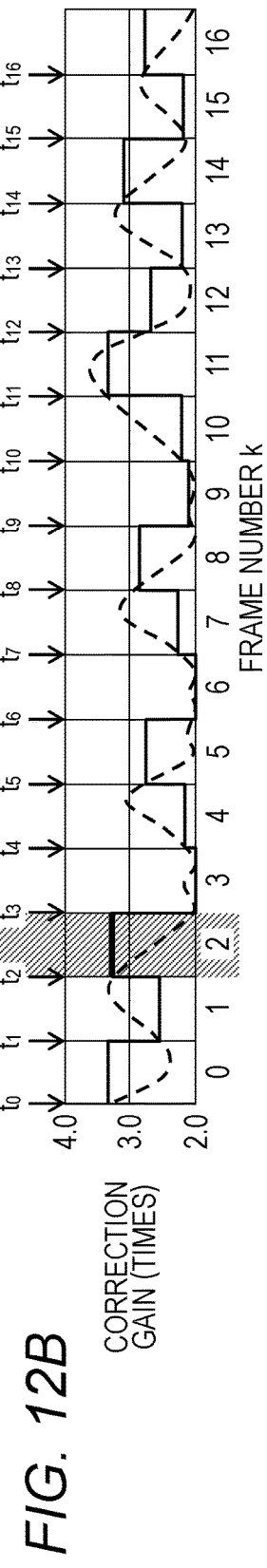
FIG. 12B is a waveform chart illustrating temporal variation of the peripheral light quantity correction gain updated every exposure time Tk in the shake correction process of the example for reference.

FIG. 12B is a waveform chart illustrating temporal variation of a peripheral light quantity correction gain updated every exposure time Tk in the shake correction process of the example for reference. A horizontal axis represents frame number k (where k=0, 1, 2, 3 . . . ), whereas a vertical axis represents the peripheral light quantity correction gain. The graph indicated by a dashed line of FIG. 12B represents real-time transition of the peripheral light quantity correction gain in the hand-shake correction operation. The stepwise graph indicated by a solid line of FIG. 12B represents transition of the peripheral light quantity correction gain at exposure start timing tk in the hand-shake correction operation. Here, the peripheral light quantity correction gain in FIG. 12B represents the peripheral light quantity correction gain corresponding to the image height of 1.0 on CCD 110. The real-time peripheral light quantity correction gain indicated by the dashed line of FIG. 12B represents the correction gain necessary for correcting the original peripheral light quantity ratio to 1.0.

Figure 13B:
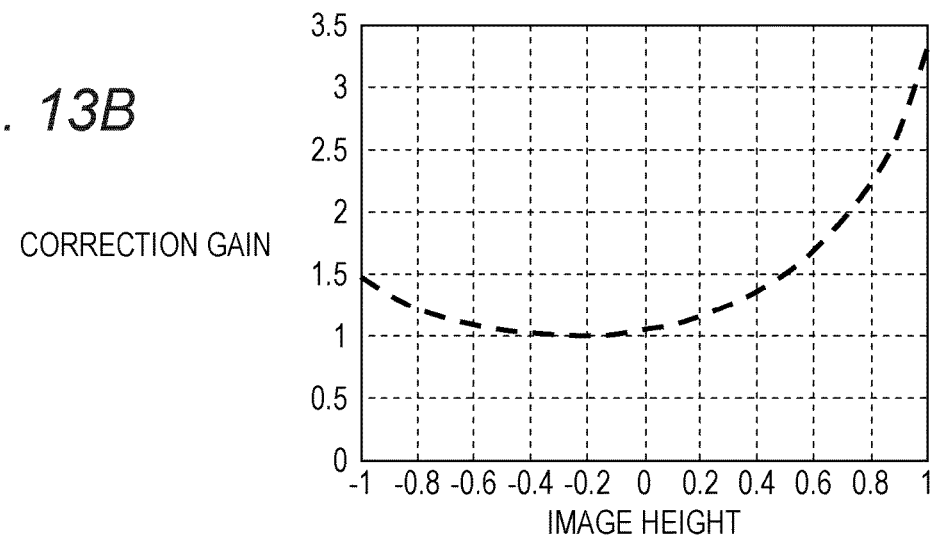
FIG. 13B is a characteristic graph of the peripheral light quantity correction gain during exposure period T2 in the digital camera of the example for reference.

FIG. 13B illustrates the peripheral light quantity correction gain corresponding to the image height with the image height of 0 at the center on CCD 110 and the image height of between −1.0 and 1.0 at the corners on CCD 110. In a case where attention is paid only to correction of the peripheral light quantity ratio when the image height is 1.0 in the following description, the peripheral light quantity correction gain (about 3.3 times) at start timing t2 of exposure period T2 at frame number k=2 of the shaded region in FIG. 12B corresponds to the peripheral light quantity correction gain when the image height is 1.0 in FIG. 13B.

Figure 12C:
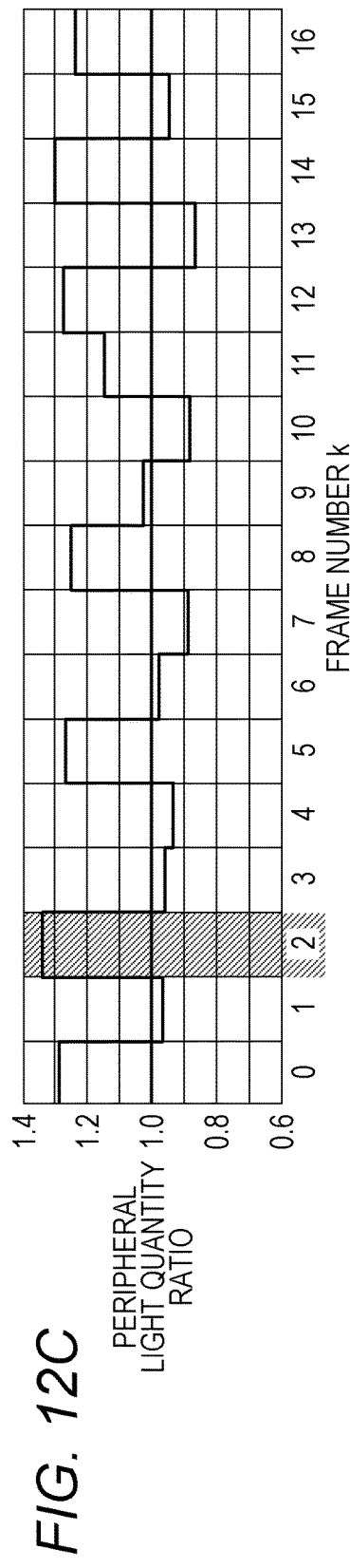
FIG. 12C is a waveform chart illustrating temporal variation of the peripheral light quantity ratio after the peripheral light quantity correction updated every exposure time Tk in the shake correction process of the example for reference.

FIG. 12C is a waveform chart illustrating temporal variation of the peripheral light quantity ratio after peripheral light quantity correction updated every exposure time Tk in the shake correction process of the example for reference. A horizontal axis represents frame number k (where k=0, 1, 2, 3 . . . ), whereas a vertical axis represents the peripheral light quantity ratio after the peripheral light quantity correction. The step-wise graph indicated by a solid line of FIG. 12C represents transition of the peripheral light quantity correction gain at exposure start timing tk in the hand-shake correction operation. Here, the peripheral light quantity ratio after the peripheral light quantity correction in FIG. 12C represents the peripheral light quantity ratio corresponding to the image height of 1.0 on CCD 110. In the example for reference, the peripheral light quantity correction is performed using the hand-shake angle or the hand-shake correction angle detected only at predetermined timing irrelevant to the exposure period, resulting in a large error from original intention of the peripheral light quantity ratio (peripheral light quantity ratio=1.0).

Figure 13C:
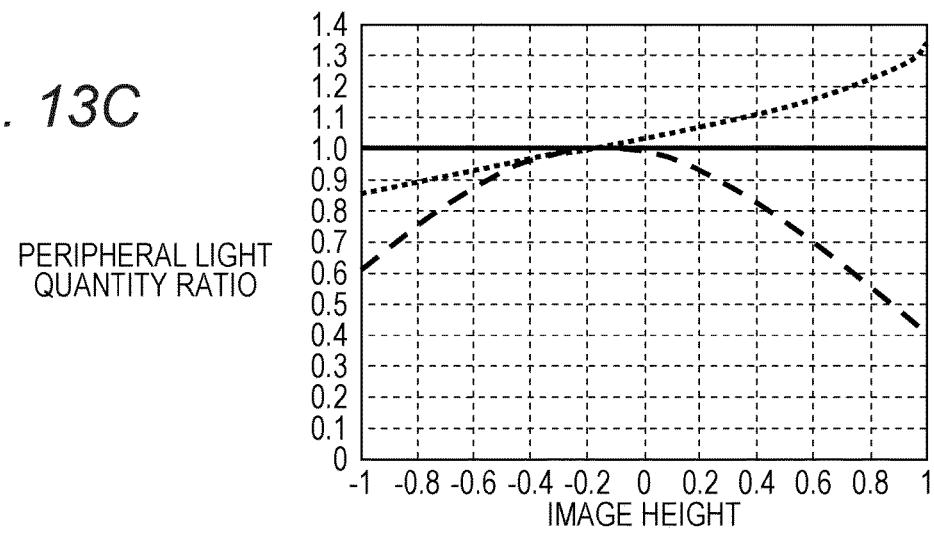
FIG. 13C is a characteristic graph of the peripheral light quantity ratio after the peripheral light quantity correction during exposure period T2 in the digital camera of the example for reference.

FIG. 13C is a characteristic graph of the peripheral light quantity ratio after the peripheral light quantity correction during exposure period T2 in the digital camera of the example for reference. FIG. 13C is a graph illustrating the peripheral light quantity characteristic after the peripheral light quantity correction corresponding to the image height with the image height of 0 at the center on CCD 110 and the image height of between −1.0 and 1.0 at the corners on CCD 110. The graph indicated by a dashed line of FIG. 13C represents the peripheral light quantity correction before the peripheral light quantity correction, and corresponds to the graph indicated by a solid line of FIG. 13A. The graph indicated by a dotted line of FIG. 13C is a graph representing the peripheral light quantity characteristic after the peripheral light quantity correction. The graph indicated by the dotted line of FIG. 13C is obtained by multiplying numerical values of the vertical axis of the graph indicated by the dashed line of FIG. 13C (identical to the graph indicated by the solid line of FIG. 13A) and the graph indicated by the dashed line of FIG. 13B together for each image height. In the example for reference, the peripheral light quantity correction is performed using the hand-shake angle or the hand-shake correction angle detected only at predetermined timing irrelevant to the exposure period, resulting in a large relative error of the peripheral light quantity ratio after the peripheral light quantity correction between respective frames.

This result indicates that performing the peripheral light quantity correction using the hand-shake angle or the hand-shake correction angle detected at predetermined timing (at time of t2 in this example) will produce a large error of the peripheral light quantity ratio after the peripheral light quantity correction from the original intention (peripheral light quantity ratio=1.0), as illustrated in FIG. 13C. Also, when attention is paid to temporal variation of the peripheral light quantity ratio after the peripheral light quantity correction at the image height of 1.0, FIG. 12C indicates that the temporal variation of the peripheral light quantity ratio after the peripheral light quantity correction will also increase during each exposure period Tk (where k=0, 1, 2, 3 . . . ).

Therefore, in the peripheral light quantity correction of the shake correction process in the example for reference, when the peripheral light quantity correction is performed using the hand-shake angle or hand-shake correction angle detected only at predetermined timing irrelevant to the exposure period, the error of the peripheral light quantity ratio after the peripheral light quantity correction will increase from the original intention (peripheral light quantity ratio=1.0). Furthermore, during capturing of a moving image, the error of the peripheral light quantity ratio after the peripheral light quantity correction will increase for each exposure period from the original intention (peripheral light quantity ratio=1.0), leading to a large error of the peripheral light quantity ratio after the peripheral light quantity correction between respective frames. This causes a flicker to appear on a periphery of the moving image, leading to conspicuous decrease in quality of the moving image.

2-3. Correction Principle Description of Peripheral Light Quantity Characteristic (the Present Exemplary Embodiment: Example 1 of CCD Shift)

The method for correcting the peripheral light quantity characteristic in the hand-shake correction operation in the present exemplary embodiment will be described with reference to FIG. 11A, FIG. 11B, FIG. 14A, FIG. 14B, FIG. 14C, FIG. 15A, FIG. 15B, and FIG. 15C. Here, in the present exemplary embodiment, the principle of the peripheral light quantity characteristic and the peripheral light quantity correction described in the first exemplary embodiment are identical, and thus detailed description of the principle will be omitted in the present exemplary embodiment.

FIG. 11A is a waveform chart of a shake detection signal and a hand-shake control signal. A horizontal axis represents frame number k (where k=0, 1, 2, 3 . . . ), whereas a vertical axis represents a hand-shake angle and a correction angle. Frame number k is incremented, for example, every ⅓₀ seconds. The hand-shake angle is calculated based on output of gyro sensor 184 (output of integrator 408) provided in camera body 100. The correction angle is calculated based on output of position sensor 182 provided in camera body 100. FIG. 11A illustrates an example of the hand-shake angle and the correction angle at frame number k from 0 to 16 (about 567 ms). Strictly speaking, characteristics differ from each other between the hand-shake angle and the correction angle due to a residual error, response delay, and the like, and thus there is an error therebetween. However, since the error is small, the hand-shake angle and the correction angle are regarded as almost identical characteristics and are superimposed in the graph.

FIG. 14A is a waveform chart illustrating temporal variation of the peripheral light quantity ratio before the peripheral light quantity correction updated every exposure time Tk in the shake correction process according to the second exemplary embodiment. A horizontal axis represents frame number k (where k=0, 1, 2, 3 . . . ), whereas a vertical axis represents the peripheral light quantity ratio. Frame number k is incremented, for example, every ⅓₀ seconds. The graph indicated by a dashed line of FIG. 14A represents real-time transition of the peripheral light quantity ratio before the peripheral light quantity correction in the hand-shake correction operation. The step-wise graph indicated by a solid line of FIG. 14A represents transition of the peripheral light quantity ratio before the peripheral light quantity correction averaged during exposure period Tk in the hand-shake correction operation. Here, the peripheral light quantity ratio in FIG. 14A represents the peripheral light quantity ratio corresponding to the image height of 1.0 on CCD 110.

Figure 15A:
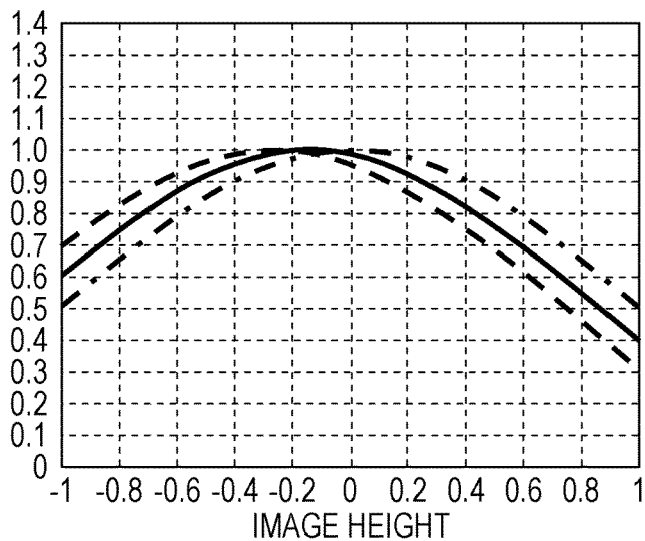
FIG. 15A is a characteristic graph of the peripheral light quantity ratio during CCD shift of exposure period T2 in the digital camera according to the second exemplary embodiment.

FIG. 15A is a characteristic graph of the peripheral light quantity ratio during CCD shift of exposure period T2 in the digital camera according to the second exemplary embodiment. FIG. 15A represents the peripheral light quantity ratio before the peripheral light quantity correction corresponding to the image height with the image height of 0 at the center on CCD 110 and the image height of between −1.0 and 1.0 at the corners on CCD 110. FIG. 11A and FIG. 14A described above each represent the peripheral light quantity ratio before the peripheral light quantity correction during exposure period T2 at frame number k=2 in a shaded region. In FIG. 15A, the graph of a dashed line is a graph representing the peripheral light quantity characteristic before the peripheral light quantity correction at time t2 in FIG. 11A. In FIG. 15A, the graph of an alternate long and short dash line is a graph representing the peripheral light quantity characteristic before the peripheral light quantity correction at time t3 in FIG. 11A. In FIG. 15A, the graph of a solid line is a graph representing the peripheral light quantity characteristic before the peripheral light quantity correction when the peripheral light quantity is averaged during exposure period T2 in FIG. 11A.

FIG. 11B is a waveform chart illustrating temporal variation of the peripheral light quantity ratio before the peripheral light quantity correction. FIG. 11B represents real-time transition of the peripheral light quantity ratio before the peripheral light quantity correction corresponding to the image height of 1.0 on CCD 110 in the hand-shake correction operation.

FIG. 14B is a waveform chart illustrating temporal variation of the peripheral light quantity correction gain updated every exposure time Tk in the shake correction process according to the second exemplary embodiment. A horizontal axis represents frame number k (where k=0, 1, 2, 3 . . . ), whereas a vertical axis represents the peripheral light quantity correction gain. The graph indicated by a dashed line of FIG. 14B represents real-time transition of the peripheral light quantity correction gain in the hand-shake correction operation. The step-wise graph indicated by a solid line of FIG. 14B represents transition of the peripheral light quantity correction gain calculated using an average of the hand-shake angle or the hand-shake correction angle detected during exposure period Tk in the hand-shake correction operation. Here, it is the key point to pay attention to exposed images being averaged during exposure period Tk and to average the hand-shake angle or the hand-shake correction angle detected during exposure period Tk to similarly calculate the peripheral light quantity correction gain. That is, a low-frequency component contained in information on the detected hand-shake angle or the hand-shake correction angle will be extracted. In general, the hand-shake angle before averaging contains a frequency component higher than 0 Hz and equal to or lower than 30 Hz. The frequency component higher than 0 Hz and equal to or lower than 15 Hz (low-frequency component of shake) is extracted through averaging of the detected hand-shake angle, and the peripheral light quantity correction gain is calculated using this component.

The peripheral light quantity correction gain in FIG. 14B represents the peripheral light quantity correction gain corresponding to the image height of 1.0 on CCD 110. The real-time peripheral light quantity correction gain illustrated by the dashed line of FIG. 14B represents the correction gain necessary for setting the original peripheral light quantity ratio to 1.0.

Figure 15B:
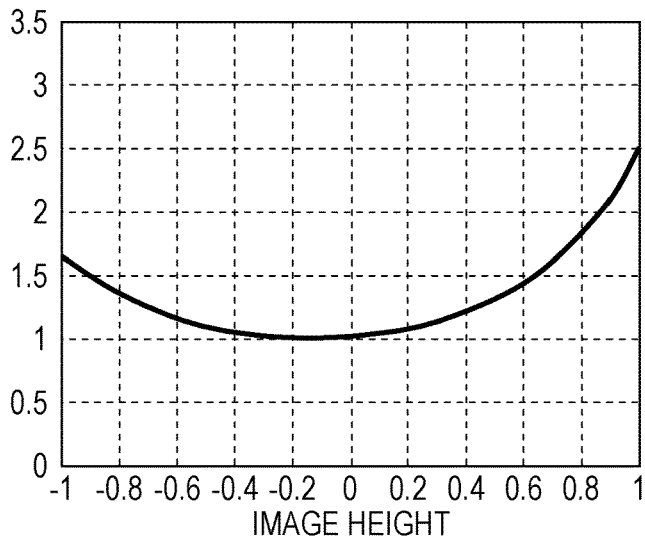
FIG. 15B is a characteristic graph of the peripheral light quantity correction gain during exposure period T2 in the digital camera according to the second exemplary embodiment.

FIG. 15B is a characteristic graph of the peripheral light quantity correction gain during exposure period T2 in the digital camera according to the second exemplary embodiment. FIG. 15B represents the peripheral light quantity correction gain corresponding to the image height with the image height of 0 at the center on CCD 110 and the image height of between −1.0 and 1.0 at the corners on CCD 110. In a case where attention is paid only to correction of the peripheral light quantity ratio when the image height is 1.0 in the following description, the peripheral light quantity correction gain (about 2.5 times) calculated using the average of the hand-shake angle or the hand-shake correction angle detected during exposure period T2 at frame number k=2 of the shaded region in FIG. 14B corresponds to the peripheral light quantity correction gain when the image height is 1.0 in FIG. 15B.

FIG. 14C is a waveform chart illustrating temporal variation of the peripheral light quantity ratio after the peripheral light quantity correction updated every exposure time Tk in the shake correction process according to the second exemplary embodiment. A horizontal axis represents frame number k (where k=0, 1, 2, 3 . . . ), whereas a vertical axis represents the peripheral light quantity ratio after the peripheral light quantity correction. The graph indicated by a solid line of FIG. 14C represents transition of the peripheral light quantity correction gain calculated using the average of the hand-shake angle or the hand-shake correction angle detected during exposure period Tk in the hand-shake correction operation. Here, the peripheral light quantity ratio after the peripheral light quantity correction in FIG. 14C represents the peripheral light quantity ratio corresponding to the image height of 1.0 on CCD 110. According to the present exemplary embodiment, the peripheral light quantity correction is performed by calculating the peripheral light quantity correction gain using the value obtained by averaging the detected hand-shake angle or the hand-shake correction angle during the exposure period, resulting in the characteristic identical to the original intention of the peripheral light quantity ratio (peripheral light quantity ratio=1.0).

Figure 15C:
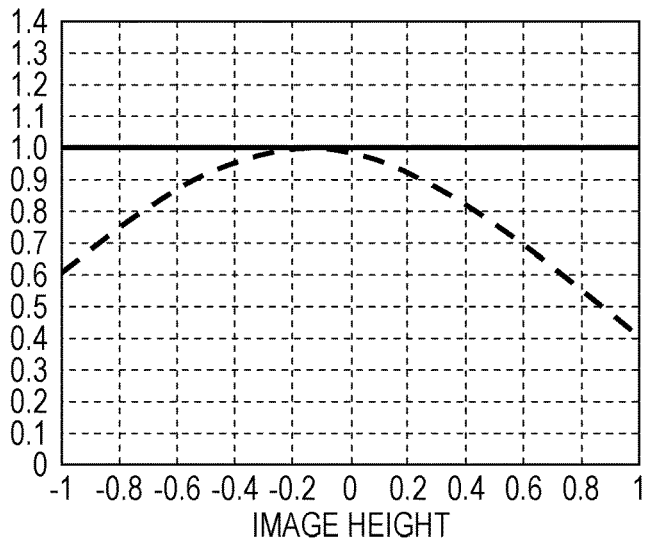
FIG. 15C is a characteristic graph of the peripheral light quantity ratio after the peripheral light quantity correction during exposure period T2 in the digital camera according to the second exemplary embodiment.

FIG. 15C is a characteristic graph of the peripheral light quantity ratio after the peripheral light quantity correction during exposure period T2 in the digital camera according to the second exemplary embodiment. FIG. 15C is a graph representing the peripheral light quantity characteristic after the peripheral light quantity correction corresponding to the image height with the image height of 0 at the center on CCD 110 and the image height of between −1.0 and 1.0 at the corners on CCD 110. The graph illustrated by a dashed line of FIG. 15C represents the peripheral light quantity correction before the peripheral light quantity correction, and corresponds to the graph illustrated by the solid line of FIG. 15A. The graph illustrated by a solid line of FIG. 15C is a graph representing the peripheral light quantity characteristic after the peripheral light quantity correction. The graph illustrated by the solid line of FIG. 15C is obtained by multiplying numerical values of the vertical axis of the graph illustrated by the dashed line of FIG. 15C (identical to the graph illustrated by the solid line of FIG. 15A) and the graph illustrated by the solid line of FIG. 15B together for each image height. According to the present exemplary embodiment, when the peripheral light quantity correction gain is calculated using the detected hand-shake angle or the hand-shake correction angle, the peripheral light quantity correction is performed through calculation of the peripheral light quantity correction gain using the value obtained by averaging the detected hand-shake angle or the hand-shake correction angle during the exposure period. This allows accurate peripheral light quantity correction to be performed on images captured during the exposure period, resulting in the characteristic identical to the original intention of the peripheral light quantity ratio (peripheral light quantity ratio=1.0).

This result indicates that in the present exemplary embodiment that performs the peripheral light quantity correction by calculating the peripheral light quantity correction gain by using the value obtained by averaging the detected hand-shake angle or the hand-shake correction angle during the exposure period, as illustrated in FIG. 15C, the peripheral light quantity ratio after the peripheral light quantity correction can have the originally intended characteristic (peripheral light quantity ratio=1.0). Also, as illustrated in FIG. 14C, when attention is paid to temporal variation of the peripheral light quantity ratio after the peripheral light quantity correction at the image height of 1.0, it is found out that there is no temporal variation of the peripheral light quantity ratio after the peripheral light quantity correction during each exposure period Tk (where k=0, 1, 2, 3 . . . ).

Therefore, the image pickup device according to the present exemplary embodiment can perform accurate peripheral light quantity correction on the image captured during the exposure period, providing the image with the intended characteristic of the peripheral light quantity ratio. Furthermore, accurate peripheral light quantity correction can be performed during each individual exposure period at a time of capturing of moving images, leading to a small error of the peripheral light quantity ratio after the peripheral light quantity correction between respective frames. This prevents a flicker, which is a problem of the example for reference, from appearing on the periphery of the moving image, enabling improvement in image quality.

2-4. Description of Operation Flow of Correcting Peripheral Light Quantity Characteristic (the Present Exemplary Embodiment: Example 1 of CCD Shift)

Next, with reference to the drawings, the following describes an operation flow of the peripheral light quantity correction during the shake correction operation in digital camera 1 according to the present exemplary embodiment. In addition to a function of capturing still images, the digital camera generally has a function of capturing moving images. The following describes a feature of the present exemplary embodiment, that is, the operation flow of the peripheral light quantity correction during the shake correction operation at a time of capturing moving images. While various methods have been employed to start capturing of moving images in the digital camera, according to the present exemplary embodiment, capturing of moving images is started by pressing (turning on) a release button. A still image capturing mode and a moving image capturing mode can be switched through an operation of a mode dial (not illustrated) or a menu (not illustrated).

FIG. 16 is a flowchart illustrating the peripheral light quantity correction process (for the CCD shift process) in the shake correction process in digital camera 1 according to the present exemplary embodiment. Processes in solid line frames represent processes of camera controller 140. Processes in broken line frames represent processes of lens controller 240. When the moving image capturing mode is selected, camera controller 140 will be in a standby condition of the moving image capturing process such as setting a frame rate (step S21). When it is determined in step S22 that the release button is turned on, the process advances to the next step and the moving image capturing process is started. While the release button is not pressed, the process of step S22 is repeated and the standby condition of the moving image capturing process is repeated. When the moving image capturing process is started, exposure period Tk is set (step S23). For example, when the frame rate is set as 30 fps and the exposure period is set as $\frac{1}{30}$ seconds, Tk is set as Tk=$\frac{1}{30}$ seconds. Exposure to CCD 110 is started based on these setting conditions. Camera controller 140 detects a position of CCD 110 during the shake correction operation in exposure period Tk, and calculates average Qk thereof (step S24). In order to perform the peripheral light quantity correction, lens controller 240 notifies camera controller 140 of information on the peripheral light quantity ratio corresponding to the image height on CCD 110 (step S25). From a design-centered perspective, the peripheral light quantity ratio is generally a numerical value that gradually decreases concentrically from the center on CCD 110. An inverse number of this notified peripheral light quantity ratio is the peripheral light quantity correction gain. This peripheral light quantity correction gain constitutes a table in which numerical values are defined at respective horizontal and vertical coordinates on a surface of CCD 110. Camera controller 140 acquires image Dk of exposure period Tk (step S26), and calculates shift amount Ik of a central position of the table of the peripheral light quantity correction gain based on average Qk of the position of CCD 110 calculated above (step S27). Camera controller 140 corrects and records image Dk based on the table of the peripheral light quantity correction gain calculated using the peripheral light quantity characteristic notified from lens controller 240 and shift amount Ik of CCD 110 that moves following the shake correction operation (step S28). Camera controller 140 determines whether to end exposure, for example, when the release button is turned off (step S29). If exposure is not ended, the process returns to step S23, and exposure in capturing of a moving image of a next frame is continued. Meanwhile, in the process of step S29, when the release button is turned off and exposure is ended, capturing of moving images is ended. Again, it is the key point to pay attention to exposed images being averaged during exposure period Tk and to average the hand-shake angle or the hand-shake correction angle detected during exposure period Tk to similarly calculate the peripheral light quantity correction gain. That is, a low-frequency component contained in information on the detected hand-shake angle or the hand-shake correction angle will be extracted. In general, the hand-shake angle before averaging contains a frequency component higher than 0 Hz and equal to or lower than 30 Hz. The frequency component higher than 0 Hz and equal to or lower than 15 Hz (low-frequency component of shake) is extracted through averaging of the detected hand-shake angle, and the peripheral light quantity correction gain is calculated using this component.

As described above, the image pickup device according to the present exemplary embodiment can perform accurate peripheral light quantity correction on the image captured during the exposure period. This allows the image pickup device to provide an image with the intended peripheral light quantity ratio characteristic. Furthermore, the image pickup device can perform accurate peripheral light quantity correction during each individual exposure period at a time of capturing of moving images. Accordingly, the error of the peripheral light quantity ratio after the peripheral light quantity correction is small between respective frames. This prevents a flicker, which is a problem of the example for reference, from appearing on the periphery of the moving image, enabling improvement in image quality.

2-5. Correction Principle Description of Peripheral Light Quantity Characteristic (the Present Exemplary Embodiment: Example 2 of CCD Shift)

In the method for correcting the peripheral light quantity characteristic in the hand-shake correction operation according to the present exemplary embodiment, the following describes a case where exposure period Tk is shorter than the frame period with reference to FIG. 17A, FIG. 17B, and FIG. 17C. Here, an example is described in which the frame period is 1/30 seconds (that is, the frame rate is 30 fps) and the exposure period is 1/60 seconds.

FIG. 17A is a waveform chart illustrating temporal variation of the peripheral light quantity ratio before the peripheral light quantity correction updated every frame number k in the shake correction process according to the second exemplary embodiment. A horizontal axis represents frame number k (where k=0, 1, 2, 3 . . . ), whereas a vertical axis represents the peripheral light quantity ratio. Frame number k is incremented, for example, every 1/30 seconds. The graph indicated by a dashed line of FIG. 17A represents real-time transition of the peripheral light quantity ratio before the peripheral light quantity correction in the hand-shake correction operation. The step-wise graph indicated by a solid line of FIG. 17A represents transition of the peripheral light quantity ratio before the peripheral light quantity correction averaged during exposure period Tk in the hand-shake correction operation. In FIG. 14A, description has been provided assuming that exposure period Tk is identical to the frame period. However, FIG. 17A differs from FIG. 14A in that exposure period Tk (here, 1/60 seconds) is shorter than the frame period (here, 1/30 seconds). Here, the peripheral light quantity ratio in FIG. 17A represents the peripheral light quantity ratio corresponding to the image height of 1.0 on CCD 110.

FIG. 17B is a waveform chart illustrating temporal variation of the peripheral light quantity correction gain updated every frame number k in the shake correction process according to the second exemplary embodiment. A horizontal axis represents frame number k (where k=0, 1, 2, 3 . . . ), whereas a vertical axis represents the peripheral light quantity correction gain. The graph indicated by a dashed line of FIG. 17B represents real-time transition of the peripheral light quantity correction gain in the hand-shake correction operation. The step-wise graph indicated by a solid line of FIG. 17B represents transition of the peripheral light quantity correction gain calculated using an average of the hand-shake angle or the hand-shake correction angle detected during exposure period Tk in the hand-shake correction operation. In FIG. 14B, description has been provided assuming that exposure period Tk is identical to the frame period. However, FIG. 17B differs from FIG. 14B in that exposure period Tk (here, 1/60 seconds) is shorter than the frame period (here, 1/30 seconds). Again, it is the key point to pay attention to exposed images being averaged during exposure period Tk and to average the hand-shake angle or the hand-shake correction angle detected during exposure period Tk to similarly calculate the peripheral light quantity correction gain. That is, a low-frequency component contained in information on the detected hand-shake angle or the hand-shake correction angle will be extracted. In general, the hand-shake angle before averaging contains a frequency component higher than 0 Hz and equal to or lower than 30 Hz. The frequency component higher than 0 Hz and equal to or lower than 15 Hz (low-frequency component of shake) is extracted through averaging of the detected hand-shake angle, and the peripheral light quantity correction gain is calculated using this component.

The peripheral light quantity correction gain in FIG. 17B represents the peripheral light quantity correction gain corresponding to the image height of 1.0 on CCD 110. The real-time peripheral light quantity correction gain indicated by the dashed line of FIG. 17B represents the correction gain necessary for setting the original peripheral light quantity ratio to 1.0.

FIG. 17C is a waveform chart illustrating temporal variation of the peripheral light quantity ratio after the peripheral light quantity correction updated every frame number k in the shake correction process according to the second exemplary embodiment. A horizontal axis represents frame number k (where k=0, 1, 2, 3 . . . ), whereas a vertical axis represents the peripheral light quantity ratio after the peripheral light quantity correction. The graph indicated by a solid line of FIG. 17C represents transition of the peripheral light quantity correction gain calculated using an average of the hand-shake angle or the hand-shake correction angle detected during exposure period Tk in the hand-shake correction operation. In FIG. 14C, description has been provided assuming that exposure period Tk is identical to the frame period. However, FIG. 17C differs from FIG. 14C in that exposure period Tk (here, 1/60 seconds) is shorter than the frame period (here, 1/30 seconds). Here, the peripheral light quantity ratio after the peripheral light quantity correction in FIG. 17C represents the peripheral light quantity ratio corresponding to the image height of 1.0 on CCD 110. According to the present exemplary embodiment, the peripheral light quantity correction is performed by calculating the peripheral light quantity correction gain using the value obtained by averaging the detected hand-shake angle or the hand-shake correction angle during the exposure period, resulting in the characteristic identical to the original intention of the peripheral light quantity ratio (peripheral light quantity ratio=1.0).

This result indicates that in the present exemplary embodiment, the peripheral light quantity ratio after the peripheral light quantity correction can have the originally intended characteristic (peripheral light quantity ratio=1.0). Also, as illustrated in FIG. 17C, when attention is paid to temporal variation of the peripheral light quantity ratio after the peripheral light quantity correction at the image height of 1.0, it is found out that there is no temporal variation of the peripheral light quantity ratio after the peripheral light quantity correction during each frame number k (where k=0, 1, 2, 3 . . . ).

Therefore, the image pickup device according to the present exemplary embodiment can perform accurate peripheral light quantity correction on the image captured during the exposure period. This allows the image pickup device to provide an image with the intended peripheral light quantity ratio characteristic. Furthermore, the image pickup device can perform accurate peripheral light quantity correction during each individual exposure period at a time of capturing of moving images. Accordingly, the error of the peripheral light quantity ratio after the peripheral light quantity correction is small between respective frames. This prevents a flicker, which is a problem of the example for reference, from appearing on the periphery of the moving image, enabling improvement in image quality.

2-6. Description of Operation Flow of Correcting Peripheral Light Quantity Characteristic (the Present Exemplary Embodiment: Example of OIS Lens Shift)

With reference to the drawings, the following describes the operation flow of the peripheral light quantity correction in the shake correction operation by OIS lens shift in digital camera 1 according to the present exemplary embodiment. In addition to a function of capturing still images, the digital camera generally has a function of capturing moving images. The following describes a feature of the present exemplary embodiment, that is, the operation flow of the peripheral light quantity correction in the shake correction operation at a time of capturing moving images. While various methods have been employed to start capturing of moving images in the digital camera, according to the present exemplary embodiment, capturing of moving images is started by pressing (turning on) the release button. The still image capturing mode and the moving image capturing mode can be switched through the operation of a mode dial (not illustrated) or a menu (not illustrated).

FIG. 18 is a flowchart illustrating the peripheral light quantity correction process by OIS lens shift in the shake correction process in digital camera 1 according to the second exemplary embodiment. Processes in solid line frames represent processes of camera controller 140. Processes in broken line frames represent processes of lens controller 240. When the moving image capturing mode is selected, camera controller 140 will be in a standby condition of the moving image capturing process such as setting the frame rate (step S31). When it is determined in step S32 that the release button is turned on, the process advances to the next step and the moving image capturing process is started. While the release button is not pressed, the process of step S32 is repeated and the standby condition of the moving image capturing process is repeated. When the moving image capturing process is started, exposure period Tk is set (step S33). For example, when the frame rate is set as 30 fps and the exposure period is set as ⅓₀ seconds, Tk is set as Tk=⅓₀ seconds. Exposure to CCD 110 is started based on these setting conditions. Camera controller 140 detects a position of OIS lens 220 during the shake correction operation in exposure period Tk, and calculates average Pk thereof (step S34). In order to perform the peripheral light quantity correction by using average Pk of the position of OIS lens 220, lens controller 240 notifies camera controller 140 of information on the peripheral light quantity ratio corresponding to the image height on CCD 110 (step S35). From a design-centered perspective, the peripheral light quantity ratio is generally a numerical value that gradually decreases concentrically from the center on CCD 110. An inverse number of this notified peripheral light quantity ratio is the peripheral light quantity correction gain. This peripheral light quantity correction gain constitutes a table in which numerical values are defined at respective horizontal and vertical coordinates on a surface of CCD 110. Camera controller 140 acquires image Dk of exposure period Tk (step S36), and calculates shift amount Hk of a central position of the table of the peripheral light quantity correction gain based on average Pk of the position of OIS lens 220 notified above (step S37). Camera controller 140 corrects and records image Dk based on the table of the peripheral light quantity correction gain calculated using the peripheral light quantity characteristic notified from lens controller 240 and shift amount Hk of OIS lens 220 that moves following the shake correction operation (step S38). In the process of step S39, camera controller 140 determines whether to end exposure, for example, when the release button is turned off. If exposure is not ended, the process returns to step S33, and exposure in capturing of a moving image of a next frame is continued. Meanwhile, in the process of step S39, when the release button is turned off and exposure is ended, capturing of moving images is ended. Again, it is the key point to pay attention to exposed images being averaged during exposure period Tk and to average the hand-shake angle or the hand-shake correction angle detected during exposure period Tk to similarly calculate the peripheral light quantity correction gain. That is, a low-frequency component contained in information on the detected hand-shake angle or the hand-shake correction angle will be extracted. In general, the hand-shake angle before averaging contains a frequency component higher than 0 Hz and equal to or lower than 30 Hz. The frequency component higher than 0 Hz and equal to or lower than 15 Hz (low-frequency component of shake) is extracted through averaging of the detected hand-shake angle, and the peripheral light quantity correction gain is calculated using this component.

Here, an example has been described in which lens controller 240 notifies camera controller 140 of average Pk of the position of OIS lens 220. However, regarding information on the position of OIS lens 220, camera controller 140 may calculate average Pk. Also, average Pk is not limited to the position of OIS lens 220, but may be shake detection information that is used for control of OIS lens 220 or information based on the shake detection information.

As described above, the image pickup device according to the present exemplary embodiment can perform accurate peripheral light quantity correction on the image captured during the exposure period. This allows the image pickup device to provide an image with the intended peripheral light quantity ratio characteristic. Furthermore, the image pickup device can perform accurate peripheral light quantity correction during each individual exposure period at a time of capturing of moving images. Accordingly, the error of the peripheral light quantity ratio after the peripheral light quantity correction is small between respective frames. This prevents a flicker, which is a problem of the example for reference, from appearing on the periphery of the moving image, enabling improvement in image quality.

In the present exemplary embodiment, the example of CCD shift and the example of OIS lens shift have been described individually. Both when CCD shift and OIS lens shift are operated simultaneously as described in the first exemplary embodiment, and when the example of CCD shift and the example of OIS lens shift are combined for the peripheral light quantity correction as described in the second exemplary embodiment, accurate peripheral light quantity correction can be performed on the image captured during the exposure period. Also, at the time of capturing of moving images, both when CCD shift and OIS lens shift are operated simultaneously as described in the first exemplary embodiment, and when the example of CCD shift and the example of OIS lens shift are combined for the peripheral light quantity correction as described in the second exemplary embodiment, accurate peripheral light quantity correction can be performed during each individual exposure period.

Accordingly, the present exemplary embodiment can provide images with the intended characteristic of the peripheral light quantity ratio even when CCD shift and OIS lens shift are operated simultaneously. Furthermore, even at the time of capturing of moving images, this prevents a flicker, which is a problem of the example for reference, from appearing on the periphery of the moving image, enabling improvement in image quality.

3. Summary

As described above, in digital camera 1 according to the present exemplary embodiment, the image pickup device that reduces influence of shake during capturing by shifting the correction lens or imaging element can prevent decrease in quality of captured images due to decrease in light quantity projected on the imaging element on the periphery of the imaging element, and can provide good captured images. In particular, digital camera 1 according to the present exemplary embodiment can also prevent decrease in quality of captured images during capturing of moving images due to decrease in light quantity projected on the imaging element on the periphery of the imaging element, and can provide good captured moving images.

The present exemplary embodiment has described an example of averaging information on the detected hand-shake angle or hand-shake correction angle in order to calculate the peripheral light quantity correction gain. However, the present exemplary embodiment is not limited to this example, but may average either signal related to the peripheral light quantity correction as a result, such as average the peripheral light quantity correction gain. Also, the present exemplary embodiment is not limited to the process of averaging but may involve smoothing a signal related to the peripheral light quantity correction.

In the image pickup device corresponding to digital camera 1 according to the present exemplary embodiment, the peripheral light quantity correction unit may have a plurality of pieces of correction data depending on the image height on the imaging element corresponding to CCD 110.

Third Exemplary Embodiment

FIG. 19A is a waveform chart illustrating temporal variation of a peripheral light quantity ratio before peripheral light quantity correction updated every six-frame exposure period in a shake correction process according to the third exemplary embodiment. A horizontal axis represents frame number k (where k=0, 1, 2, 3 . . . ), whereas a vertical axis represents the peripheral light quantity ratio. Frame number k is incremented, for example, every $\frac{1}{30}$ seconds. A graph indicated by a dashed line of FIG. 19A represents real-time transition of the peripheral light quantity ratio before the peripheral light quantity correction in a hand-shake correction operation. A step-wise graph indicated by a solid line of FIG. 19A represents transition of the peripheral light quantity ratio before the peripheral light quantity correction averaged during the six-frame exposure period in the hand-shake correction operation. Here, the peripheral light quantity ratio in FIG. 19A represents the peripheral light quantity ratio corresponding to an image height of 1.0 on CCD 110.

FIG. 19B is a waveform chart illustrating temporal variation of a peripheral light quantity correction gain updated every six-frame exposure period in a shake correction process according to the third exemplary embodiment. A horizontal axis represents frame number k (where k=0, 1, 2, 3 . . . ), whereas a vertical axis represents the peripheral light quantity correction gain. A graph indicated by a dashed line of FIG. 19B represents real-time transition of the peripheral light quantity correction gain in the hand-shake correction operation. A step-wise graph indicated by a solid line of FIG. 19B represents transition of the peripheral light quantity correction gain calculated using an average of the hand-shake angle or the hand-shake correction angle detected during the six-frame exposure period in the hand-shake correction operation. Here, it is the key point to pay attention to exposed images being averaged during the six-frame exposure period and to average a hand-shake angle or hand-shake correction angle detected during the six-frame exposure period to similarly calculate the peripheral light quantity correction gain. That is, a low-frequency component contained in information on the detected hand-shake angle or the hand-shake correction angle will be extracted. In this case, the hand-shake angle before averaging contains a frequency component of 5 Hz. The frequency component of 5 Hz (low-frequency component of shake) is extracted through averaging of the detected hand-shake angle, and the peripheral light quantity correction gain is calculated using this component.

The peripheral light quantity correction gain in FIG. 19B represents the peripheral light quantity correction gain corresponding to the image height of 1.0 on CCD 110. The real-time peripheral light quantity correction gain illustrated by the dashed line of FIG. 19B represents the correction gain necessary for setting the original peripheral light quantity ratio to 1.0.

As described above, the present exemplary embodiment may perform the averaging process over a plurality of exposure periods Tk.

Another Exemplary Embodiment

An idea of the above-described exemplary embodiments is not limited to the exemplary embodiments described above. Various exemplary embodiments may be considered. The following describes another exemplary embodiment to which the idea of the above-described exemplary embodiments can be applied.

Although the first to third exemplary embodiments have described the examples that use the interchangeable lens and camera body, a lens integrated camera may be used.

As described above, the exemplary embodiments have been described as illustration of the technique in the present disclosure. For this purpose, the detailed description and accompanying drawings have been disclosed. Accordingly, the components described in the detailed description and accompanying drawings may include components unessential for solving problems. Therefore, it should not be acknowledged immediately that those unessential components be essential because those unessential components are described in the detailed description and accompanying drawings.

The above-described exemplary embodiments are intended to illustrate the technique in the present disclosure. Therefore, various changes, replacements, additions, and/or omissions may be made to the above-described exemplary embodiments within the scope of the appended claims or equivalents thereof.

The idea of the present disclosure is applicable to electronic apparatuses with the hand-shake correction function (such as an image pickup device including a digital camera and camcorder, cellular phone, and smart phone).

What is claimed is:

1. An image pickup device comprising:
   an optical system including a plurality of lenses;
   an image sensor that captures a subject image formed by the optical system;
   a processor configured to correct peripheral light quantity of an image captured by the image sensor;
   a shake detector that detects shake of the image pickup device; and a drive controller that moves at least one of (i) the plurality of lenses and (ii) the image sensor on a plane perpendicular to an optical axis in response to an output signal of the shake detector to correct the shake,
wherein
    the processor extracts a predetermined frequency component of the shake and corrects peripheral light quantity by increasing gain of image data outputted from the image sensor in response to correction gain in response to the predetermined frequency component of the shake.

2. The image pickup device according to claim 1, wherein the processor extracts the predetermined frequency component of the shake from the output signal of the shake detector, and changes the correction amount of the peripheral light quantity in response to the predetermined frequency component of the shake.

3. The image pickup device according to claim 1, wherein the processor extracts the predetermined frequency component of the shake from a drive control signal to move at least one of (i) the plurality of lenses and (ii) the image sensor in the drive controller, and then the processor changes the correction amount of the peripheral light quantity in response to the predetermined frequency component of the shake.

4. The image pickup device according to claim 1, wherein the processor has a plurality of pieces of correction data depending on an image height on the image sensor.

5. The image pickup device according to claim 1, further comprising:
    an interchangeable lens including the optical system; and
    a camera body including the image sensor and the processor,
    wherein
    the interchangeable lens and the camera body are detachable.

6. The image pickup device according to claim 5, wherein the optical system includes a correction lens for correcting the shake.

* * * * *